US011337432B1

(12) United States Patent
Tao et al.

(10) Patent No.: US 11,337,432 B1
(45) Date of Patent: May 24, 2022

(54) AUTOMATED CRAB MEAT PICKING SYSTEM AND METHOD

(71) Applicant: UNIVERSITY OF MARYLAND, COLLEGE PARK, College Park, MD (US)

(72) Inventors: Yang Tao, North Potomac, MD (US); Robert Vinson, Rockville, MD (US); Dongyi Wang, College Park, MD (US); Maxwell Holmes, Washington, DC (US); Gary E. Seibel, Westminster, MD (US)

(73) Assignee: University of Maryland, College Park, College Park, MD (US)

( * ) Notice: Subject to any disclaimer, the term of this patent is extended or adjusted under 35 U.S.C. 154(b) by 248 days.

(21) Appl. No.: 16/373,979

(22) Filed: Apr. 3, 2019

Related U.S. Application Data

(60) Provisional application No. 62/711,032, filed on Jul. 27, 2018, provisional application No. 62/652,248, filed on Apr. 3, 2018.

(51) Int. Cl.
*A22C 29/02* (2006.01)
*A23L 17/40* (2016.01)
(Continued)

(52) U.S. Cl.
CPC .......... *A22C 29/023* (2013.01); *A22C 29/025* (2013.01); *A22C 29/028* (2013.01);
(Continued)

(58) Field of Classification Search
CPC ....... A22C 29/00; A22C 29/005; A22C 29/02; A22C 29/023; A22C 29/025
(Continued)

(56) References Cited

U.S. PATENT DOCUMENTS 2,502,091 A * 3/1950 Harris .................. A22C 29/025
452/1
3,302,236 A * 2/1967 Harris .................. A22C 29/025
452/1
(Continued)

OTHER PUBLICATIONS

Abadi, et al. "TensorFlow: A system for large-scale machine learning." Proc 12th USENIX Symposium Operating Systems Design and Implementation (Nov. 2016), pp. 265-283.
(Continued)

*Primary Examiner* — David J Parsley
(74) *Attorney, Agent, or Firm* — Rosenberg, Klein & Lee

(57) ABSTRACT

A vision guided intelligent system for automated crab meat picking operates in a fully automated or semi-automatic modes of operation using a crab meat picking routine based on (a) the CNN model localization of back-fin knuckles algorithm, and/or (b) the Deep Learning model which accurately locates not only knuckle positions, but also crab legs and crab cores, with a high pixel accuracy (up to 0.9843), and low computation time. The subject system uses a concept of analyzing crab morphologies obtained from digital crab images, and, using a Deep Learning architecture integrated in the system, segments crab images into five regions of interest in a single step with high accuracy and efficiency. The image segmentation results are used for generating crab cut lines in XYZ and angular directions, determining starting cutting points in Z plane, and guiding cutting tools and end effectors to automatically cut crabs and harvest crab meat.

8 Claims, 16 Drawing Sheets

(51) Int. Cl.
  *G06K 9/78* (2006.01)
  *B65B 35/44* (2006.01)
  *G06T 7/70* (2017.01)
(52) U.S. Cl.
  CPC .............. *A23L 17/40* (2016.08); *B65B 35/44* (2013.01); *G06K 9/78* (2013.01); *G06T 7/70* (2017.01)
(58) Field of Classification Search
  USPC .............................. 452/1, 7, 8, 10, 150, 157
  See application file for complete search history.

(56) References Cited

U.S. PATENT DOCUMENTS

| | | | | |
|---|---|---|---|---|
| 3,750,234 | A | | 8/1973 | Rodgers et al. |
| 4,003,103 | A | * | 1/1977 | Wenstrom ............... A22C 29/00 452/7 |
| 4,073,041 | A | * | 2/1978 | Davis .................... A22C 29/025 198/341.07 |
| 4,293,981 | A | * | 10/1981 | Smith .................... A22C 29/023 452/1 |
| 4,503,586 | A | * | 3/1985 | Lockerby ............. A22C 29/025 452/1 |
| 4,829,636 | A | * | 5/1989 | Caroon .................. A22C 29/00 452/9 |
| 5,366,405 | A | * | 11/1994 | Keith .................... A22C 29/026 452/180 |
| 5,401,207 | A | * | 3/1995 | Hicks .................... A22C 29/021 452/1 |
| 5,580,303 | A | * | 12/1996 | Winslow ................ A22C 29/02 452/1 |
| 5,928,072 | A | * | 7/1999 | Fulcher ................ A22C 29/025 452/1 |
| 8,915,772 | B2 | | 12/2014 | Zhou |
| 9,930,896 | B2 | * | 4/2018 | Ledet ................. G06K 9/00664 |
| 2015/0359205 | A1 | * | 12/2015 | Garland ................... G06K 9/00 382/110 |
| 2016/0183542 | A1 | * | 6/2016 | Fogarty ................ A22C 29/025 452/1 |

OTHER PUBLICATIONS

Badrinarayanan, et al. "SegNet: A deep convolutional encoder-decoder architecture for image segmentation." IEEE Trans. Pattern Analysis and Machine Learning, vol. 39, No. 12 (Jan. 2017), pp. 2481-2495. doi: 10.1109/TPAMI.2016.2644615.

Bentley. "Multidimensional binary search trees used for associative searching." Communs. ACM, vol. 18, No. 9 (Sep. 1975), pp. 509-517. doi: 10.1145/361002.361007.

Beucher & Meyer. "The morphological approach to segmentation: the watershed transformation." In "Mathematical Morphology in Image Processing," ed. Dougherty (Jan. 1993), pp. 433-481.

Bin, et al. "Three-dimensional shape enhanced transform for automatic apple stem-end/calyx identification." Opt. Eng. vol. 46, No. 1 (Jan. 2007), p. 017201. doi: 10.1117/1.2434382.

Chen, et al. "A novel automatic tongue image segmentation algorithm: Color enhancement method based on L*a*b* color space." Proc. 2015 IEEE Intl. Conf. Bioinformatics and Biomedicine (BIBM) (Nov. 2015), pp. 990-993. doi: 10.1109/BIBM.2015.7359818.

Duchi, et al. "Adaptive subgradient methods for online learning and stochastic optimization." J Machine Learning Research, vol. 12 (Jul. 2011), pp. 2121-2159.

Esteva, et al. "Dermatologist-level classification of skin cancer with deep neural networks." Nature 542 (Feb. 2017), pp. 115-118. doi: 10.1038/nature21056.

Feltault. "We're our own boss: gendered class-consciousness and white privilege among Hooper's Island crab pickers." Anthropol. Work Rev., vol. 26, No. 1 (Mar. 2005), pp. 1-13. doi: 10.1525/awr.2005.26.1.1.

Galletti, et al. "Mechanical separation of green crab (*Carcinus maenas*) meat and consumer acceptability of a value-added food product." J Aquatic Food Product Tech., vol. 26, No. 2 (Feb. 2017), pp. 172-180. doi: 10.1080/10498850.2015.1126663.

Gilbert, et al. "Robust fastener detection for autonomous visual railway track inspection." Proc. 2015 IEEE Winter Conf. Applications of Computer Vision (Jan. 2015), pp. 694-701. doi: 10.1109/WACV.2015.98.

Gillman. "Development and characterization of pastas containing underutilized crab mince." Electronic Theses and Dissertations, University of Maine (Aug. 2001).

Girshick, et al. "Rich feature hierarchies for accurate object detection and semantic segmentation." Proc. 2014 IEEE Conf. Computer Vision and Pattern Recognition (Jun. 2014), pp. 580-587. doi: 10.1109/CVPR.2014.81.

He, et al. "Deep residual learning for image recognition." Proc. 2016 IEEE Conf. Computer Vision and Pattern Recognition (Jun. 2016), pp. 770-778. doi: 10.1109/CVPR.2016.90.

Hinton & Salakhutdinov. "Reducing the dimensionality of data with neural networks." Science vol. 313, No. 5786 (Jul. 2006), pp. 504-507. doi: 10.1126/science.1127647.

Hubel & Wiesel. "Receptive fields and functional architecture of monkey striate cortex." J Physiol. vol. 195, No. 1 (Mar. 1968), pp. 215-243. doi: 10.1113/jphysiol.1968.sp008455.

Huval, et al. "An empirical evaluation of deep learning on highway driving." arXiv:1504.01716 (Apr. 2015).

Jia, et al. "Caffe: Convolutional Architecture for Fast Feature Embedding." Proc. 22nd ACM Intl. Conf. Multimedia (Nov. 2014), pp. 675-678. doi: 10.1145/2647868.2654889.

Jiang, et al. "Discrimination of black walnut shell and pulp in hyperspectral fluorescence imagery using Gaussian kernel function approach." J Food Eng. vol. 81, No. 1 (Jul. 2007), pp. 108-117. doi: 10.1016/j.jfoodeng.2006.10.023.

Kamilaris & Prenafeta-Boldú. "Deep learning in agriculture: a survey." Computers and Electronics in Agriculture, vol. 147, No. 1 (Apr. 2018), pp. 70-90. doi: 10.1016/j.compag.2018.02.016.

Kingma & Ba. "Adam: A method for stochastic optimization." arXiv:1412.6980 (Dec. 2014).

Krizhevsky, et al. "ImageNet classification with deep convolutional neural networks." Proc. 25th Intl. Conf. Neural Information Processing Systems (Dec. 2012), pp. 1097-1105. doi: 10.1145/3065386.

Lawrence, et al. "Face recognition: a convolutional neural network approach." IEEE Trans. Neural Networks, vol. 8, No. 1 (Jan. 1997), pp. 98-113. doi: 10.1109/72.554195.

LeCun, et al. "Learning algorithms for classification: A comparison on handwritten digit recognition." Proc. CTP-PBSRI Joint Workshop Theoretical Physics (Feb. 1995).

Lin, et al. "Design and testing of an automated high-throughput computer vision guided waterjet knife strawberry calyx removal machine." J Food Eng. vol. 211 (2017), pp. 30-38. doi: 10.1016/j.jfoodeng.2017.05.002.

Litjens, et al. "A survey on deep learning in medical image analysis." Med Image Analysis, vol. 42 (Feb. 2017), pp. 60-88. doi: 10.1016/j.media.2017.07.005.

Long, et al. "Fully convolutional networks for semantic segmentation." Proc. 2015 IEEE Conf. Computer Vision and Pattern Recognition (Jun. 2015), pp. 3431-3440. doi: 10.1109/CVPR.2015.7298965.

Masci, et al. "Stacked convolutional auto-encoders for hierarchical feature extraction." Proc. 21st Intl. Conf. Artificial Neural Networks (Jun. 2011), pp. 52-59.

Mohanty, et al. "Using deep learning for image-based plant disease detection." Front. Plant Sci., vol. 7 (Sep. 2016), p. 1419-25. doi: 10.3389/fpls.2016.01419.

Nezhat, et al. "Robotic-assisted management of endometriosis." In "Atlas of Single-Port, Laparoscopic, and Robotic Surgery: A Practical Approach in Gynecology," eds. Escobar & Falcone (May 2014), pp. 251-261.

Otsu. "A threshold selection method from gray-level histograms." IEEE Trans. Systems, Man, and Cybernetics, vol. 9, No. 1 (Jan. 1979), pp. 62-66. doi: 10.1109/TSMC.1979.4310076.

(56) References Cited

OTHER PUBLICATIONS

Reichenspurner, et al. "Use of the voice-controlled and computer-assisted surgical system zeus for endoscopic coronary artery bypass grafting." J Thoracic and Cardiovascular Surgery, vol. 118, No. 1 (Jul. 1999), pp. 11-16. doi: 10.1016/S0022-5223(99)70134-0.

Ren, et al. "Faster R-CNN: towards real-time object detection with region proposal networks." IEEE Trans. Pattern Analysis and Machine Intelligence, vol. 39, No. 6 (Jun. 2015), pp. 1137-1149. doi: 10.1109/TPAMI.2016.2577031.

Ronneberger, et al. "U-net: Convolutional networks for biomedical image segmentation." Proc. 18th Intl. Conf. Medical Image Computing and Computer Assisted Intervention (Oct. 2015), pp. 234-241. doi: 10.1007/978-3-319-24574-4_28.

Simonyan & Zisserman. "Very deep convolutional networks for large-scale image recognition." Proc. 3rd Intl. Conf. Learning Representations (Apr. 2015).

Szegedy, et al. "Going deeper with convolutions." Proc. 2015 IEEE Conf. Computer Vision and Pattern Recognition (Jun. 2015), pp. 1-9. doi: 10.1109/CVPR.2015.7298594.

Tao, et al. "Machine vision for color inspection of potatoes and apples." Trans. ASAE, vol. 38, No. 5 (Sep. 1995), pp. 1555-1561. doi: 10.13031/2013.27982.

Turk & Pentland. "Face recognition using eigenfaces." Proc. 1991 IEEE Conf. Computer Vision and Pattern Recognition (Jun. 1991), pp. 586-591. doi: 10.1109/CVPR.1991.139758.

Viola & Jones. "Rapid object detection using a boosted cascade of simple features." Proc. 2001 IEEE Comp. Soc. Conf. Computer Vision and Pattern Recognition (Dec. 2001). doi: 10.1109/CVPR.2001.990517.

Wang, et al. "Convolutional neural network guided blue crab knuckle detection for autonomous crab meat picking machine." Opt. Eng. vol. 57, No. 4 (Apr. 2018), p. 043103. doi: 10.1117/1.OE.57.4.043103.

Weeks & Hague. "Color segmentation in the HSI color space using the K-means algorithm." Proc. SPIE, vol. 3026 (Apr. 1997), pp. 143-154. doi: 10.1117/12.271117.

Wu, et al. "Brain tumor detection using color-based k-means clustering segmentation." Proc. 3rd Intl. Conf. Intelligent Information Hiding and Multimedia Signal Processing (Nov. 2007), pp. 245-250. doi: 10.1109/IIHMSP.2007.4457697.

Xue & Liu. "Intelligent storage and retrieval systems based on RFID and vision in automated warehouse." J Networks, vol. 7, No. 2 (Jan. 2012), pp. 365-369. doi: 10.4304/jnw.7.2.365-369.

* cited by examiner

FIG. 8
FIG. 9
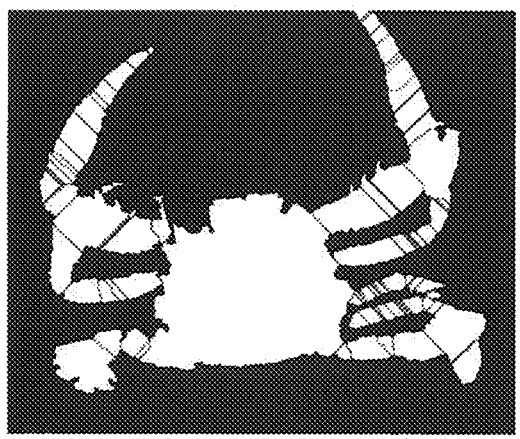
FIG. 10A            FIG. 10B A Typical a* Channel Image with Rough Knuckle Positions Typical Final Knuckle Detection Result A Typical Cutline Generated from Template Matching Method.

Naive Centroid and its Polling Result

Updated Centroid and its Polling Result

The image of polling weight map using the CNN model trained by completely random non-knuckle samples K-means clustering based on R, G, B value K-means clustering based on a* value Typical Labelled Crab Image

AUTOMATED CRAB MEAT PICKING SYSTEM AND METHOD

STATEMENT REGARDING FEDERAL SPONSORED RESEARCH OR DEVELOPMENT

This invention was made with Government support under Contract No. 20186702127417 awarded by USDA NIFA. The Government has certain rights in the Invention.

REFERENCE TO THE RELATED APPLICATIONS

This Utility Application is based on the Provisional Patent Applications 62/652,248 filed on 3 Apr. 2018 and 62/711,032 filed on 27 Jul. 2018.

FIELD OF THE INVENTION

The present invention relates to meat processing machines, and more in particular, to an automated crab meat picking system, which can operate in a fully automated or a semi-automated modes of operation.

The present invention is further directed to an automatic and autonomous crabmeat picking system integrated with intelligent vision sensors to automatically guide high-pressure water jet cutting tools and meat picking end effectors to expose and harvest crabmeat without involvement of human operators.

The present invention is also directed to a crabmeat processing system embedded with a vision guided robotics for a crab disassembly operating in accordance with images processing routine designed to extrapolate the crab structure information obtained from crab images acquired by intelligent vision sensors to mechanical actions of robotic cutting tools and end effectors for cutting crabs and harvesting crab meat.

In addition, the present invention is directed to a crabmeat picking system having an optical imaging system and operating under the guidance of a Convolution Neural Network (CNN) architecture integrated therewith, and/or using the Deep Learning morphology segmentation architecture to segment crab images into five regions of interest in a single step with high accuracy and efficiency.

BACKGROUND OF THE INVENTION

Blue crab is one of the most valuable seafood product in the United States. However, in the crab industry, the outdated crab processing technique is ill-matched to its potential market demand. Compared to the quick development of automatic food processing area, prior art automatic crab processing falls far behind.

Current crab processing machines mainly focus on taking the crab shell off by mechanic-based design. However, the challenge facing current processing machines is their tendency to destroy the integrity of the delicate crab meat due to the rudimentary mechanical nature. Thus, disadvantageously, hand picking is still the only widespread method to pick crab meat without destroying its delicate integrity. The decreasing availability of skilled workers in recent years has given rise to a need for designing an automatic crab meat picking machine to alleviate the labor shortfall.

Machine vision is a promising technology in the automation area. With the advance of computer vision technologies, intelligent sensory driven machines promise a great future in many areas such as autonomous driving, warehouse management, and computer aided diagnosis. The computer vision technology has achieved a great success in many agriculture applications where intelligent sensors, such as cameras and near infrared light, may offer detailed object information which can guide machines to conduct different operations. Some vision-aided food processing machines have been developed for certain commercial uses, such as strawberry calyx removal and apple inspection. However, an efficient crab meat picking machine remains elusive. This is mainly due to the complicated image processing techniques that need to be developed and dexterous mechanical designs required to complete the task.

The advent of robot-assisted surgical systems, such as the Da Vinci and Zeus systems, has shown the possibilities of accurate robotic operations. However, these systems cannot be utilized in crab processing because they depend on direct human guidance, disqualifying them from a field where full autonomy is required.

It would be highly desirable to design an autonomous and automated vision-guided crab processing machine capable of extrapolating information from the crab structure acquired from crab images to control cutting tools for slicing crabs and to control end effector for the crab meat removal.

SUMMARY OF THE INVENTION

It is therefore an object of the present invention to provide an autonomous vision guided crab processing system which is configured for extrapolation of the information obtained from crab images acquired by an imaging system to control mechanical actions of cutting tools and crab meat removing end effectors.

It is a further object of the present invention to provide an intelligent vision guided system configured to automate the crab meat picking process which operates under the guidance of a novel processing architecture embedded in the crab processing system to reliably detect the back-fin knuckles position in the crabs images for computing the size and orientation of the crabs and to obtain the crab meat compartment location.

It is an additional object of the present invention to provide an automated vision guided crab meat picking system operating either in a fully automated mode of operation or in a semi-automated mode of operation in accordance with an accurate and reliable image processing algorithm for precise localization of back-fin knuckles in digital images of crabs based on Convolution Neural Networks (CNN) methodology which supports the rough localization of knuckles' position, executes a K-means clustering routine applied to the rough knuckles position to extract the final (exact) knuckles position based on the back-fin knuckles color features, and generates a crab cutline in an XY plane using a template matching routine.

It is another object of the present method to provide an automated crab meat picking system integrated with an intelligent vision system for acquiring detailed crab structure information which is processed in accordance with the Deep Learning image processing architecture configured to extract image features for detecting various structures of the crab body in the most efficient and expedited manner.

It is a further object of the present invention to provide an automated crab meat picking system integrated with the Deep Learning based image segmentation architecture to automatically segregate, in a single step, a full-sized crab image (as a network input) into five regions of interest (ROIs), such as the crab legs, crab core, pair of back-fin knuckles, crab back bones, and conveyor background, and to guide the cutting tools to cut the crab's body vertically in the XY plane and angularly in a precise and efficient manner in accordance with the crab body segregation results, and to control the motion of the meat removing end effectors to pick the meat from the opened compartments of the crab's body.

The current system uses a dual-mode operation, i.e., the subject system picks crab meat based either on the CNN model for back-fin knuckles localization, or, in an alternative embodiment, based on the Deep Learning architecture integrated with the subject system.

The Deep Learning architecture is inherited from autoencoder and is designed to transfer the segmentation problem into a pixel-level classification problem. The subject system can segment crab images into five regions of interest in a single step with high accuracy and efficiency, and subsequently sections and removes the meat from steamed crabs.

In order to implement either the processing routine based on CNN and/or Deep Learning processing routine(s), the subject system is equipped with the integrated optical imaging system and one or more cutting stations which operate to open each compartment of the crab, as prescribed by the processor of the subject system, to optimize the removal of the crab meat.

The imaging of each crab provides the cutting station(s) with the uniquely computed paths for the cutting tools to follow based on the topography and physical features identified by the subject processing algorithm.

One of the cutting stations traces the outer edge of the crab, and removes the knuckles and chitin which enclose the back fin meat. The downstream cutting station slices the crab horizontally to expose the thinner, smaller chamber meat.

The subsequent station (meat removal station) removes the crab meat from the cut-up (opened) chambers and portions of the crab body and moves the crab meat to a separate conveyor system, where it is prepared for packaging.

The shells of the desiccated crabs are discarded into bins for collection at the end of the process conveyor belt.

The core task of the subject Deep Learning image processing routine is to automatically achieve crab morphology segmentation in a single step, i.e., to segment the crab image into the conveyor background, crab core, crab legs, back-fin knuckles, and back bones. The segmentation result can subsequently be directly applied to control the mechanical system, i.e., to guide the cutting tools and meat removing end effectors along the computed motion trajectories.

The application of convolutional layers in the network takes both global and local information into consideration, and the segmentation results consider the blob size, absolute and relative positions of components and the hidden features of the crab image. Based on the segmentation result of the crab back-fin knuckles and the centroid of crab cores, a template matching method is applied to generate the trajectory of crab core cut.

Statistical data validates the effectiveness of the subject segmentation performance of crab knuckles and crab cores. The attained correlation coefficients of predicted crab back-fin knuckles locations and the ground truth locations are as large as 0.99, and may attain even larger coefficients. With a 5-pixel resolution, 81% of knuckles can be found correctly by the subject processing approach. With 10-pixel resolution, 97% of knuckles can be found correctly.

For the segmentation of the crab core, the attained average offset between the predicted centroid and ground truth centroid is (0.29, 1.26) pixels with a standard derivation of (2.29, 5.55) pixels. With 0.2 mm pixel resolution of the system, the segmentation accuracy approaches 1 mm. The processing speed of the subject software model satisfies the requirements of online applications, and for a single crab image (800*800 pixels), the average segmentation time-cost is as short as about 241 ms.

The subject system can operate either in a fully automated mode of operation or in a semi-automatic mode of operation. In the fully automated mode of operation, the meat removal station automatically picks the crab meat following the cutting stations(s), thus totally replacing human involvement in the process. In the semi-automatic mode of operation, the manual meat picking can be used after the crab is automatically cut at the cutting station(s) along the crab body boundary and the top cover to reveal the crab meat chambers. In the semi-automatic mode of operation, the subject system permits the human co-robot activity where the machine performs the cutting, while human operators are involved in the manual crab meat picking. In commercial settings, either fully or semi-automated modes of operation may be chosen, depending on the facilities' financial abilities, labor availability, costs, etc.

In one aspect, the present invention is directed to a system for automatic crab processing, which includes a conveyor belt linearly displaceable in a stepped fashion, and carrying crabs loaded thereon in a spaced apart relationship one with respect to another.

The subject system further is equipped with a dual-modality imaging system (also referred to herein as a vision system) disposed in alignment with the conveyor belt in proximity to a first end thereof. The imaging system is configured with a Red-Green-Blue (RGB) color imaging sub-system and a 3-dimensional (3-D) laser imaging sub-system for obtaining images of each crab traveling on the conveyor belt. The RGB color imaging sub-system generates 2-D crab morphology information, including a crab size and the crab orientation on the conveyor belt. The 3-D laser imaging sub-system generates 3-D laser information. The dual-modality imaging system produces and outputs a 3-D crab model based on the 2-D crab morphology information and the 3-D laser information.

At least one cutting station is positioned along the conveyor belt downstream the imaging sub-system. The cutting station is equipped with a controllable cutting tool for automatic crab cutting.

A meat removal station is disposed downstream the cutting station and is equipped with controllable end effector tools for automatic crab meat removal.

The subject system further includes a computer system operatively coupled to the dual-modality imaging sub-system for processing the crab images received therefrom.

A uniquely configured image processing sub-system is integrated with the computer system. The image processing sub-system operates in at least two modes of operations, i.e., based on the Convolution Neural Network (CNN) image processing routine, and/or the Deep Learning image processing routine. The image processing sub-system analyzes and processes the images, and generates instructions relative to at least a cutline of each crab based on the crab morphology acquired from each image.

A control sub-system is operatively coupled between the computer system and the cutting station, the meat removal station, and the conveyor belt to control and synchronize the stepped motion of the conveyor belt and the operation of the cutting tool at the cutting station, as well as the operation of the end effector tool at the meat removal station in accordance with the cutline generated by the image processing sub-system for automatic crab cutting and crab meat removal.

When operating in the Convolution Neutral Network (CNN) processing mode of operation, the image processing sub-system determines, based on the color information extracted from the image, a back-fin knuckle position, and generates a crab cutline in the XY plane based on the back-fin knuckle position. The crab cutline is transmitted from the image processing sub-system to the control sub-system and the cutting station to robotically actuate the cutting tool in accordance therewith.

When operating in the Deep Learning image processing mode of operation, the image processing sub-system executes the routine of parallel segmentation of the crab image into various regions-of-interest (ROIs), including the conveyor background, crab legs, crab core, back-fin knuckles, and crab back bones, and subsequently executes the post-segmentation processing routine which is adapted for computing the crab cutline using the back-fin knuckles position via a template matching routine as well as locating the crab chamber meat based on the crab core position.

The subject system may include a vertical cutting station for cutting the crab along the lump meat walls to reveal jumbo meat components based on the 2-D crab morphology information, and an angled cutting station for performing an angular cut based on the 3-D crab model to expose small compartments of the crab body.

Each of cutting stations is equipped with the cutting tool configured, preferably, with a waterjet nozzle for performing precise thin cuts in XYZ directions, in accordance with the trajectory corresponding to the crab cutline generated by the image processing sub-system.

The subject control sub-system may include a set of linear motors operatively coupled to the vertical cutting station and digitally controlled at a predetermined motion speed and precision, an angular servo-motor operatively coupled to the angular cutting station, and a step motion servo-motor operatively coupled to the conveyor belt. The control sub-system tracks a position of each crab at the vertical cutting and angled cutting stations, as well as at the meat removal station.

The control sub-system further is equipped with an encoder sub-system coupled to the computer system. The computer sub-system processes the encoder's clock signal to synchronize and track the operation of the conveyor belt, and the cutting stations, as well as the meat removal station.

The vertical cutting station, the angled cutting station, the meat removal station, and the control sub-system share the instructions generated by the image processor sub-system.

In another aspect, the present invention is directed to a method for automatic crab meat picking. The subject method operates in the environment of the crab meat picking system, which comprises a conveyor belt, a dual-modality imaging sub-system (also referred to herein as a vision sub-system) disposed in alignment with the conveyor belt in proximity to a first end, at least one cutting station positioned in alignment with the conveyor belt downstream the vision sub-system, and equipped with a controllable cutting tool, and a meat removal station disposed downstream the cutting station and equipped with at least one end effector tool to remove the crab meat.

The present method includes the following operational steps:
loading crabs on the conveyor belt in a spaced apart relationship with a predetermined distance therebetween,
operatively coupling an image processing sub-system to the imaging sub-system, submitting images from the imaging sub-system to the image processing sub-system, and applying thereto a predetermined processing routine selected from a group comprising Convolution Neural Network (CNN) image processing routine, Deep Learning image processing routine, and combination thereof, and
computing, by the image processing sub-system, instructions relative to a cutline of each crab loaded on the conveyor belt.

The subject method continues by embedding a control sub-system between the image processing sub-system, the cutting stations, and the meat picking removal station, as well as the conveyor belt, and synchronizing, by the control sub-system, a stepped motion of the conveyor belt and rotational operation of the cutting and meat removal tools in accordance with the instructions output by the image processing sub-system.

When operating the subject image processing sub-system in a Convolution Neutral Network (CNN) processing mode of operation, the subject method proceeds through the following routines:
determining, based on the color information extracted from the RGB image, a back-fin knuckle location,
generating a crab cutline in the XY plane based on the back-fin knuckle location,
transmitting the crab cutline from the image processing sub-system to the control sub-system and the cutting station, and
actuating the cutting tool at the cutting station in accordance therewith.

When operating the subject image processing sub-system in a Deep Learning segmentation processing mode of operation, the present method proceeds through the following routines:
segmenting, substantially in parallel, the 3-D crab image into a number of regions-of-interest (ROIs) including a conveyor belt background, crab legs, crab core, back-fin knuckles, and crab back bones,
determining the crab cutline in XY plane using the back-fin knuckles location by applying a template matching processing routine to the ROIs, and
locating the chamber meat of crab based on the crab core position.

The subject method further continues with the steps of:
generating 2-D crab morphology information by a RGB color imaging sub-system of the imaging system, where the 2-D crab morphology information includes a crab size and the crab orientation on the conveyor belt,
generating a 3-D laser information by the 3-D laser imaging sub-system integrated in the imaging system; and
generating, by the imaging system, a 3-D crab model based on the 2-D crab morphology information and the 3-D laser information.

The subject method further proceeds via the steps of:
providing a vertical cutting station and an angled cutting station,
forming the cutting tools at each of the vertical cutting station and the angled cutting station as waterjet nozzle-type cutting tools for performing thin and precise cuts in XYZ directions,
controlling the cutting tool at the vertical cutting station by the control sub-system to cut the crab along the cutline to reveal jumbo meat components based on the 2-D crab morphology information, and performing an angular cut at the angled cutting station based on the 3-D crab model to expose small compartments of the crab body.

The control sub-system is equipped with set of linear motors operatively coupled to the vertical cutting station, an angular servo-motor operatively coupled to the angular cutting station, and a step motion servo-motor operatively coupled to the conveyor belt.

The subject method further proceeds with the steps of:

digitally controlling the linear motors, the angular servo-motor, and the step-motion servo-motor at a predetermined motion speed and precision to control operation of the cutting tools and linear displacement of the conveyor belt in a stepped fashion, and tracking and synchronizing, in cooperation with an encoder embedded in the control sub-system, a position of each crab at the vertical cutting and angled cutting stations, respectively.

The subject method further comprises the steps of:

executing the CNN image processing routine by:

acquiring crab images by the dual-modality imaging sub-system, applying a sliding window to the images to slice each image into small regions (sub-images), applying the binary knuckle detection CNN classification model to determine a region (sub-image) containing a target knuckle, generating a rough localization result of the knuckle in the region, computing a final localization of the target knuckle by applying a pixel-based k-means clustering routine to the rough localization result, and applying a template matching routine to generate the crab cutline in XY plane.

When executing the CNN processing routine prior to the application of the sliding window, the subject method performs the routine of pre-processing the image to remove the conveyor belt background and to determine the main body centroid through transforming the image into a binary format image and applying a distance transformation routine to the binary format image, generating a gray scale image containing pixel values describing a distance between a specific pixel and a closest background pixel, applying a watershed routine to the grayscale image to merge pixels with similar grayscale value into a group, and training the CNN knuckle location classification model by a training dataset containing a plurality of knuckle sub-image regions and no-knuckle sub-image regions of a predetermined size.

After the training of the CNN knuckle detection model, the subject method determines the rough localization of the knuckle by applying a polling processing routine to the sub-image regions by computing a polling weight map image of the sub-image regions, and selecting regions having a largest mean weight value as the rough knuckle localization.

These and other objects and advantages of the present invention will be fully understood when taken in view of the Patent Drawings and Detailed Description of the Preferred Embodiment(s).

BRIEF DESCRIPTION OF THE DRAWINGS

FIG. 8 is a typical a* channel image of the crab body;

FIG. 9 is an image of the crab body after the conveyor background removal;

FIGS. 10A-10B demonstrate the watershed procedure, where FIG. 10A depicts the result of distance transformation for the watershed routine, and FIG. 10B shows the result for the watershed segmentation routine;

DETAILED DESCRIPTION OF THE PREFERRED EMBODIMENTS

Figure 1A:
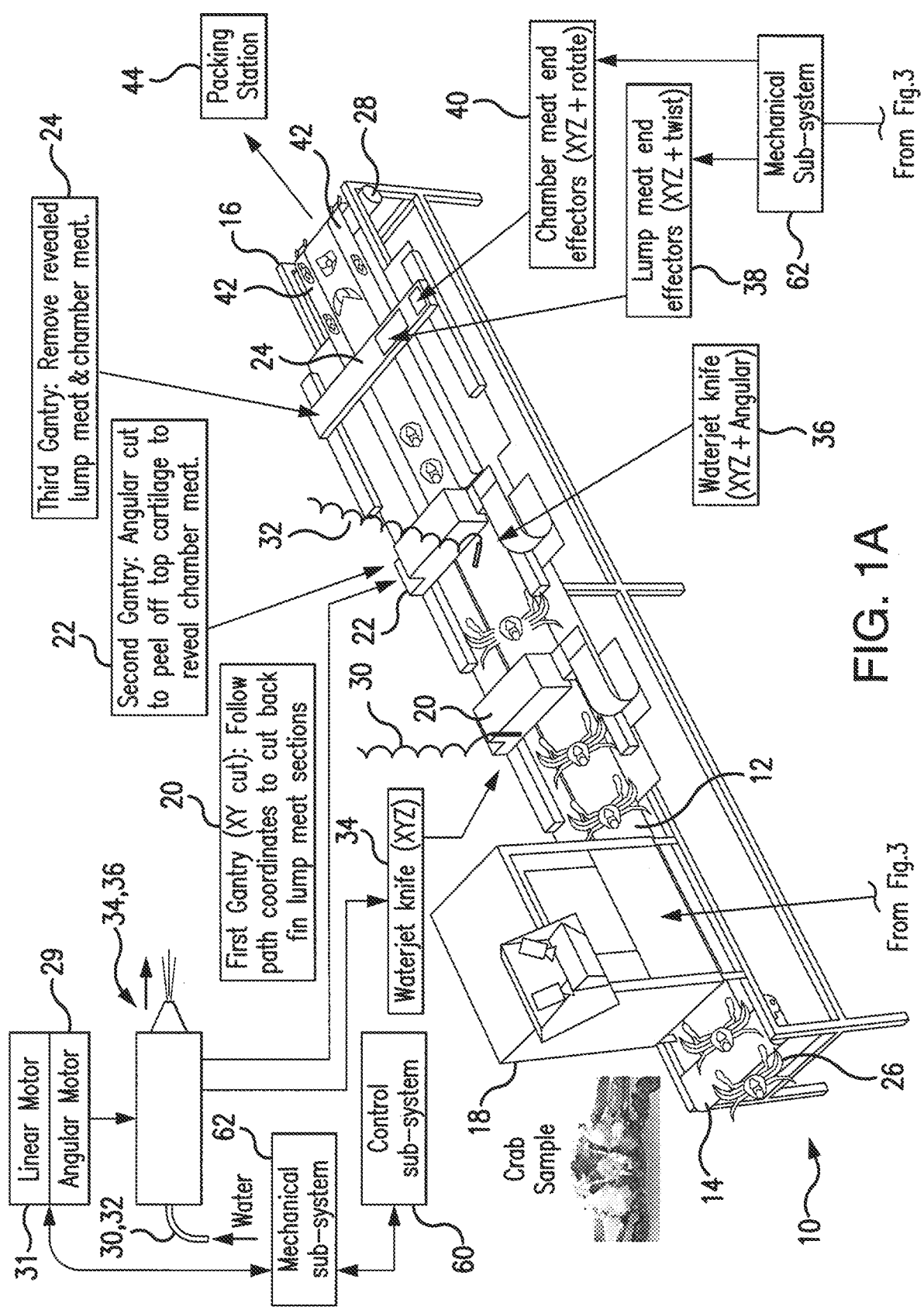
FIG. 1A is a pictorial view of the subject crab meat picking system.

Referring to FIGS. 1A and 2-4, the autonomous crab meat picking system 10 of the present invention includes a conveyor belt 12 linearly displaceable in a stepped fashion between the front (entrance) edge 14 and the rear (discharge) edge 16, a vision station (also referred to herein as an imaging system) 18, located in proximity to the entrance edge 14 of the conveyor belt 12, one (or more) cutting stations 20, 22, and a meat removal station 24.

The cutting stations are positioned downstream the imaging system 18, and may be presented by an X,Y vertical cutting station 20 and an angular cutting station 22.

The meat removal station 24 is located downstream of the cutting stations 20 and 22 and may be positioned proximal to the discharge edge 16 of the conveyor belt 12. The meat removal station 24 is adapted for removal of the lump meat and chamber meat which is revealed by cutting the crabs either at the XY/vertical cutting station 20, or at the station 20 and the angular cutting station 22.

The subject system 10 can operate either in a fully automated mode of operation or in a semi-automatic mode of operation. In the fully automated mode of operation, the meat removal station 24 automatically picks the crab meat following the cutting stations(s) 20,22, thus totally replacing human involvement in the process. In the semi-automatic mode of operation, the manual meat picking can be used after the crab is automatically cut at the cutting station(s) 20,22 along the crab body boundary and the top cover to reveal the crab meat chambers. In the semi-automatic mode of operation, the subject system permits the human co-robot activity where the machine performs the cutting, while human operators are involved in the manual crab meat picking. In commercial settings, either fully or semi-automated modes of operation may be chosen, depending on the facilities' financial abilities, labor availability, costs, etc.

The entrance edge 14 serves to load the crabs 26 on the conveyor belt 12 upstream the vision station 18. Prior to loading onto the conveyor belt 12, crabs 26 are steamed and cooled to solidify the protein according to the current industrial crab meat picking practice. Crabs may be all de-backed to remove the top shell and internal organs.

Figure 2:
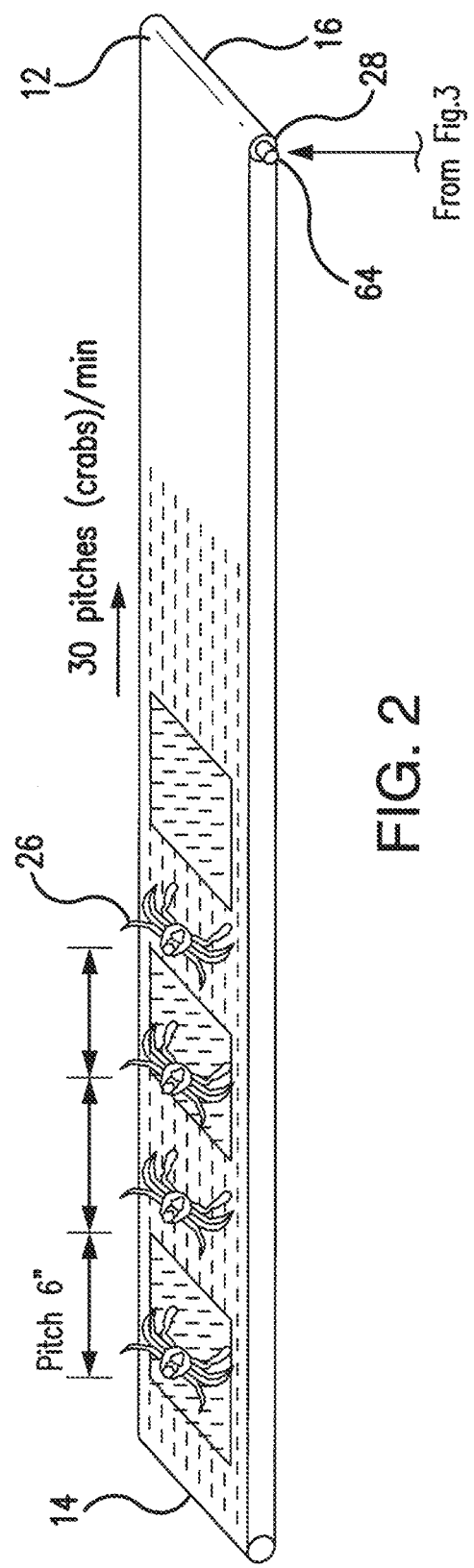
FIG. 2 is a schematic representation of the conveyor belt linearly displaceable in stepped fashion with crabs positioned thereon.
Figure 4:
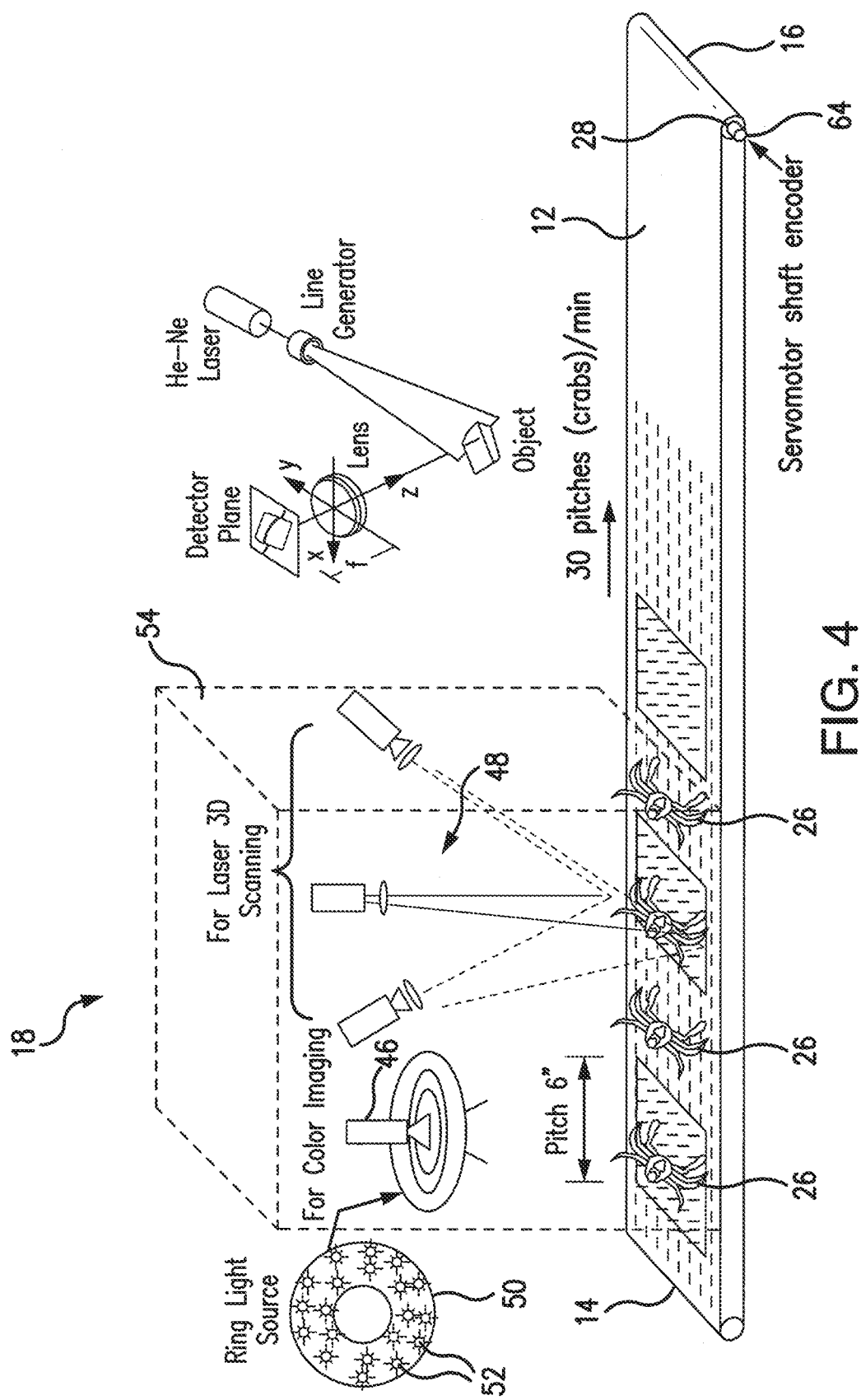
FIG. 4 is a schematic representation of the imaging system in the subject crab meat picking system.

The conveyor belt 12 is, for example, a mesh conveyor formed from stainless steel which is driven by a servo motor 28 in a stepped fashion. As shown in FIGS. 1A, 2 and 4, the crabs 26 are loaded onto the conveyor belt 12 at a predetermined distance, for example, 6 inches apart. The positioning of the crabs 26 on the conveyor belt 12 at a predetermined spaced apart relationship one from another facilitates crabs tracking and synchronization operation of all involved sub-systems of the subject system 10.

Each cutting station, either XY cutting station 20 (performing vertical cuts in the XY plane), or the angular cutting station 22, is equipped with a cutting tool, which may be represented, for example, by a high-pressure water-jet cutting tool. The cutting tool is a robotic sub-system which is configured with a high-pressure water-jet hose 30 (at the XY cutting station 20), and the high-pressure water-jet hose 32 (at the angular cutting station 24) which serve to supply water to water-jet nozzles (knives) 34 and 36, respectively. The water-jet knife 34 (referred to herein also as XYZ water-jet knife) at the XY cutting station 20 is controlled to make vertical cuts (Z direction) in two directions at the XY (horizontal) plane. The water-jet knife 36 (referred to herein also as XYZ plus angular knife) at the angular cutting station 24 has more degrees of freedom, and makes a two directional horizontal XY cut, a vertical cut, and an angular cut.

To be able to make an angular cut, the water-jet knife 36 is controllably positioned to assume a required angular orientation regarding X, Y and Z axes, and actuated for the cutting action by the subject control sub-system (as will be detailed in further paragraphs).

The meat removal station 24 is equipped with end effectors 38, 40 such as, for example, spoon-like end effectors, and comb-like end effectors (schematically shown in FIG. 1A). The meat removal end effectors may be specifically adapted for removal of the lump meat and chamber meat revealed by cutting the crab body (to be detailed in further paragraphs).

For example, the end effector 38 may be adapted for lump meat removal and can move in XYZ directions, and rotate. The end effector 40 may be adapted for chamber meat removal, and can be controllably displaced in XYZ directions, as well as rotate, as needed for the crab chamber meat removal.

Subsequently to the chamber and lump meat removal at the meat removal station 24, the crab meat travels on a pair of meat belts 42 which extend from the meat removal station 24 to the discharge edge 16 to carry the removed lump and chamber meat to a crab meat packing station 44 (schematically shown in FIG. 1A). Shells also may travel on the conveyor belt 12 aside from the meat belts 42 to the discharge edge 16 and be removed from the system and discarded.

Figure 1B:
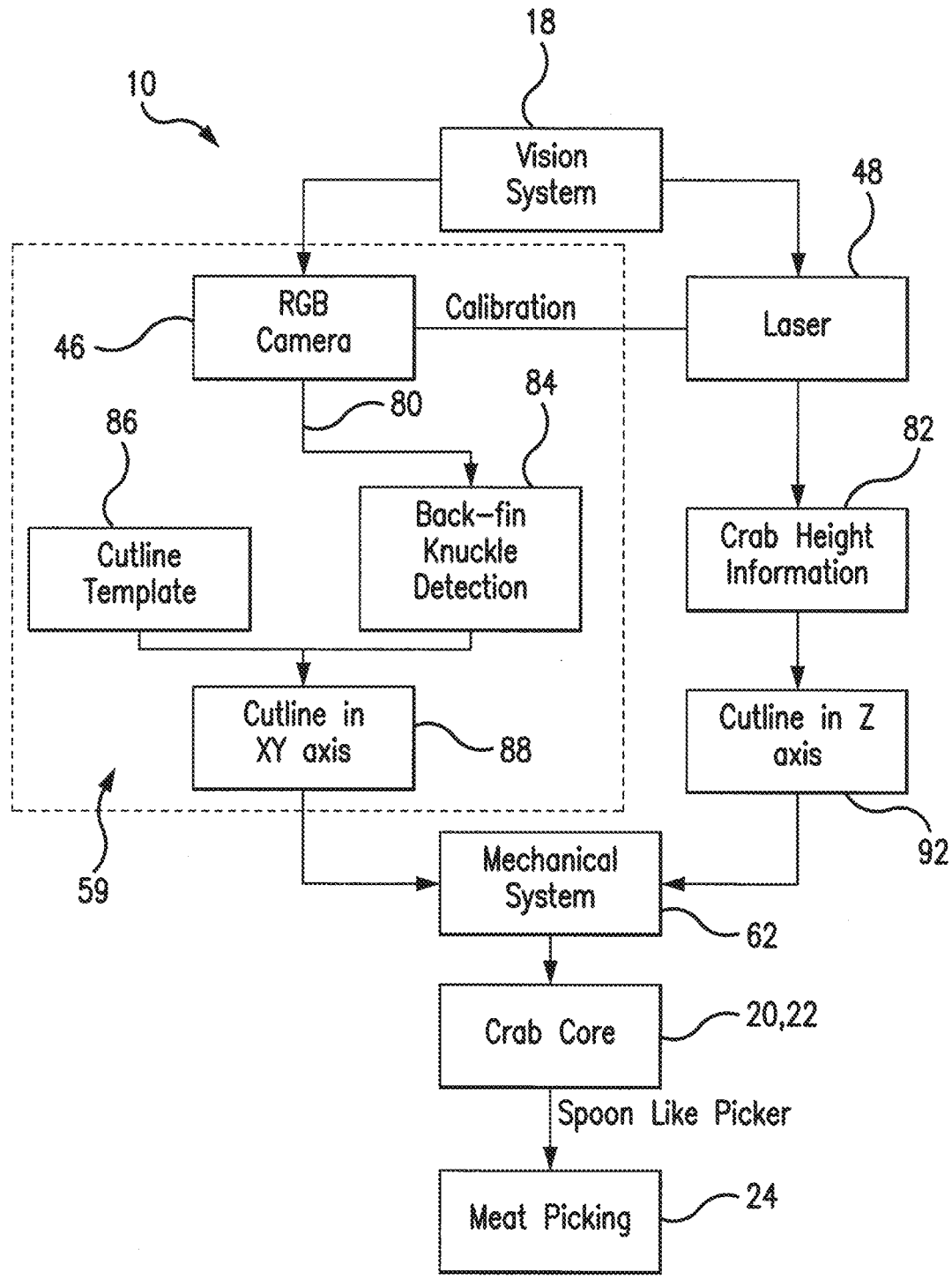
FIG. 1B is an operational flowchart diagram of the subject system in the CNN-based back-fin knuckle detection mode of operation.

Referring to FIGS. 1A, 1B and 4, the vision station (imaging system) 18 is preferably a dual-modality vision system which may produce both the 2-D color images and the three-dimensional (3-D) images.

The vision station (sub-system) 18 includes, for example, a Charged Coupled Device (CCD) camera 46 for two-dimensional (2-D) RGB (red-green-blue) image acquisition. The vision station 18 is also equipped with a laser scanning system 48 for the 3-D laser scanning of the crabs 26 while the crabs travel on the conveyor belt 12 from the entrance edge 14 through the vision station 18. A ring-like source 50 (which may be equipped with numerous LEDs 52) is mounted underneath the CCD camera 46 to provide stable lighting.

The entire vision sub-system 18 is enclosed in an IP 69 waterproof food grade enclosure 54 for food sanitation safety purposes and electronic protection.

The autonomous crab meat picking system 10 further includes a computer system 56 (best presented in FIGS. 1A and 3) operatively coupled to the vision sub-system 18. The computer system 56 is responsible for processing images in accordance with the image processing algorithm 58 (detailed in further paragraphs). The computer system 56 also provides support for fully automated synchronized operation of the subject system 10.

The subject system 10 further includes a control sub-system 60 which is operatively coupled to the computer system 56 to control the operation of the mechanical sub-system 62 for executing operation of the cutting tools, end effectors, and conveyor belt, as well as other involved mechanical parts, in a highly synchronized fashion. The control sub-system 60 supports the operation of the entire system 10 in accordance with the results of the images processing by the algorithm 58 running on the computer sub-system 56.

The mechanical sub-system 62 in the context of the subject system 10, includes the mechanisms supporting the operation of the conveyor belt 12, robotics of the cutting tools and crab meat removing end effectors. Various subsystems of the subject system 10 cooperate with each other in a highly synchronized order. Various actuators, such as motors (servo-motors) adapted to move the conveyor belt 12, the cutting tools 34, 36, and the end effectors 38, 40, as well as other associated parts of the system 10 cooperating with each other to support the operation of the subject system, are controlled by the control sub-system 60 in accordance with instructions generated by the image processing sub-system 58.

The control sub-system 60 also controls the motion of the 3-D scanning laser sub-system 48 of the vision station 18, and synchronizes the image taking routine by the CCD camera 46 (Glaser scanning system 48) with other routines executed in the system.

The control sub-system 60 may be a customized SST LinMot robotic gantry motion system equipped with controllers permitting 4 degrees of freedom, for the XYZ and angular displacement of the water-jet knives 34, 36 and the end effectors 38, 40 at the cutting stations 20, 22 and meat removal station 24, respectively.

For synchronization and tracking of the operation of the system 10, the control sub-system 60 further includes an encoder 64 operating in cooperation with the servo-motor 28 which actuates the stepwise displacement of the conveyor belt 12. The readings of the encoder 64 are transmitted to the computer system 56 to be processed and are used by the control sub-system 60 to control the system operation.

The control sub-system 60 operates in correspondence with the algorithm 58 embedded in the computer system 56, and controls the operation of the conveyor belt 12, the laser system 48, the cutting tools 34, 36, and the end effectors 38, 40, as well as the meat belts 42, in accordance with the results of the images processing (computed by the algorithm 58).

The control sub-system 60 cooperates with the computer system 56 and the algorithm 58 therein, as well as the encoder 64, to synchronize the operation of various parts of the mechanical sub-system 62.

Figure 3:
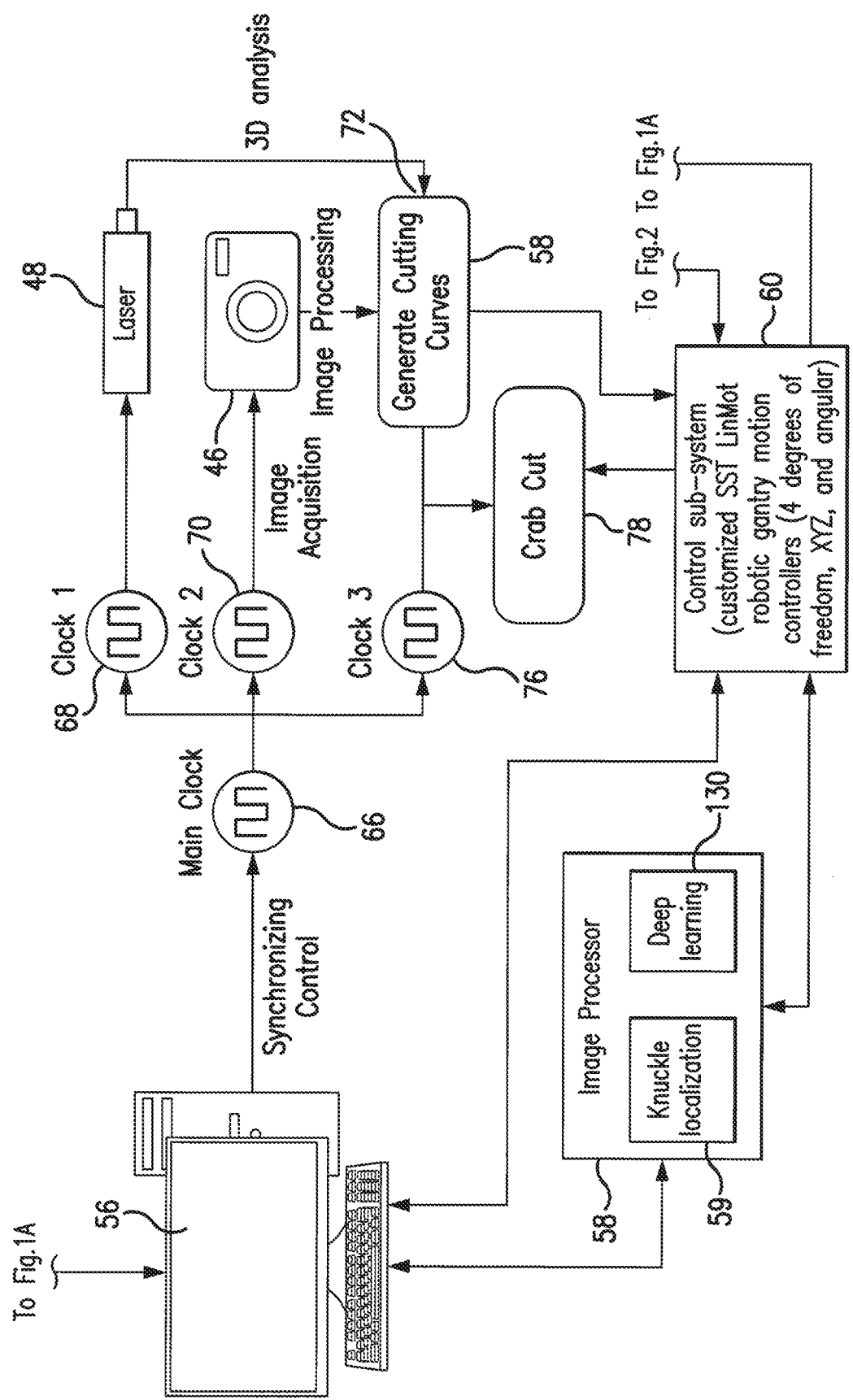
FIG. 3 is a schematic representation of the control sub-system integrated with the subject system.

As shown in FIGS. 1A and 3, the control sub-system 60 uses a main clock 66 of the computer system 56 for synchronization purposes. The control sub-system 60 also uses the clock 68 for synchronizing with the operation of the laser system 48. In addition, the control sub-system 60 uses the clock 70 in accordance with which image acquisition and their preprocessing is performed. The crab images are supplied to the computer system 56 for 3-D analysis. The results of the 3-D pre-processing and analysis of the images are further transmitted to the cutting curves generation processing sub-system 72 for generation of cutting curves (cutlines) to control the operation of the cutting stations 20 and 22, and the meat removal station 24.

The control sub-system 60 further cooperates with the clock 76 in accordance with which the cutting curves generated at the cutting curves sub-system 72 are supplied to the crab cut processing sub-system 78, which controls the cutting trajectories of the water-jet knives 34 and 36 at the cutting stations 20 and 22, respectively, to cut the crabs, in accordance with the generated cut lines.

The computer system 56 coordinates the operation of the clocks 68, 70, 76, in accordance with the main block 66, to synchronize and control the operation of the entire system 10.

The subject system 10 is envisioned for operation in at least two modes of operation. For this purpose, as shown in FIGS. 1A and 3, the algorithm (image processing system) 58 embedded in the computer system 56, is configured to process the images acquired by the vision sub-system 18 either (a) by using Convolutional Neural Network (CNN) for back-fin knuckles detection processing sub-system 59, or (b) by using the Deep Learning based crab morphology segmentation architecture 130.

In accordance with the CNN for back-fin knuckles detection routine 59, as schematically shown in FIG. 1B, the operation of the subject system 10 begins by acquiring two-dimensional (XY) colored images 80 by the dual-mode vision sub-system 18 using the RGB (Red-Green-Blue) camera 46. The dual-mode vision sub-system 18 also acquires 3-D images 82 by the laser system 48.

The RGB camera 46, which preferably is a CCD camera, and the laser system 48 are exposed to a calibration process, and their operation is synchronized by the control sub-system 60 using the clocks 68 and 70, as shown in FIG. 3.

The output of the laser system 48, i.e., the 3-D laser images 82, carry the crab height information which is used for generation of the vertical cut line. The 2-D RGB images 80 are processed for the back-fin knuckles detection in the back-fin knuckles detection sub-system 84 which are used (as will be detailed in further paragraphs) for computing the horizontal plane) cut line (XY plane) through application of the cut line template routine in the cut line template processor sub-system 86.

Subsequent to the image processing in the cutline template processing sub-system 86 and the back-fin knuckle detection processing sub-system 84, the XY is computed in the cutline in XY axis processing sub-system 86. The cutline in the XY axis is supplied from the processing sub-system 88 to the mechanical system 62 which is controlled by the control sub-system 60 to cut the crab for the crab case exposure at the cutting stations 20 and 22, and for meat picking at the meat removal station 24.

As shown in FIG. 1B, the crab height information obtained as the result of the 3-D laser scanning is supplied to the vertical cut line in the Z axis computing sub-system 92. This information is subsequently used by the control sub-system 60 to control the motion of the cutting tools 34 and 36 at the cutting stations 20, 22, respectively. The crab image analysis performed by the computer system 56 in accordance with the routines executed by the algorithm 58 is of importance for the operation of the subject system 10.

Figure 5:
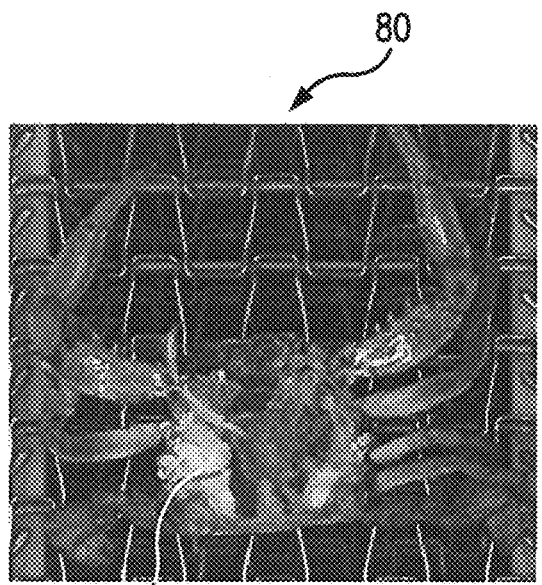
FIG. 5 is a typical crab image acquired by the subject imaging system.
Figure 6:
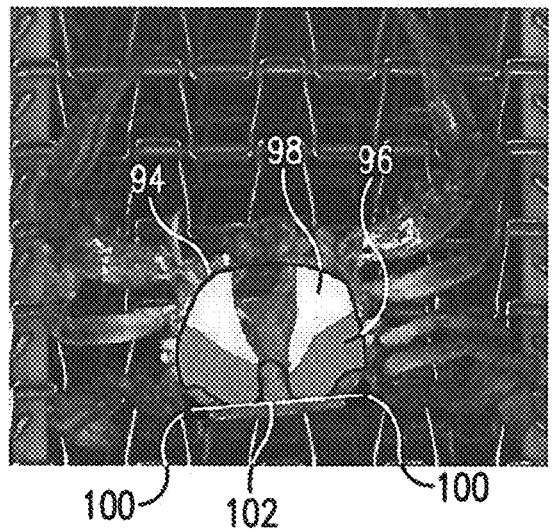
FIG. 6 is a representation of the crab body morphological structure.

FIG. 5 shows a typical crab image obtained by the subject vision imaging system 18. FIG. 6 shows the corresponding morphological structures of the crab body. The ideal crab cutline in the XY plane is the line 94 shown in FIG. 6, which can slice along the chitin walls to expose the jumbo meat (shown as the part 96 in FIG. 6) and the chamber meat (shown as the part 98 in FIG. 6).

Although, most crabs share similar morphological structures, it is impossible to directly calculate the cutline from the images because of the noise found around the crab's main body, which is produced by the eggs, lungs tissues, and leg joints. However, the pair of backfin knuckles 100 (shown in FIG. 6) is a more reliable feature, which exists in most crabs regardless of the status of their rear legs. The back-fin knuckles contain information about the crab size, orientation on the conveyor, and the location of jumbo meat.

Figure 7:
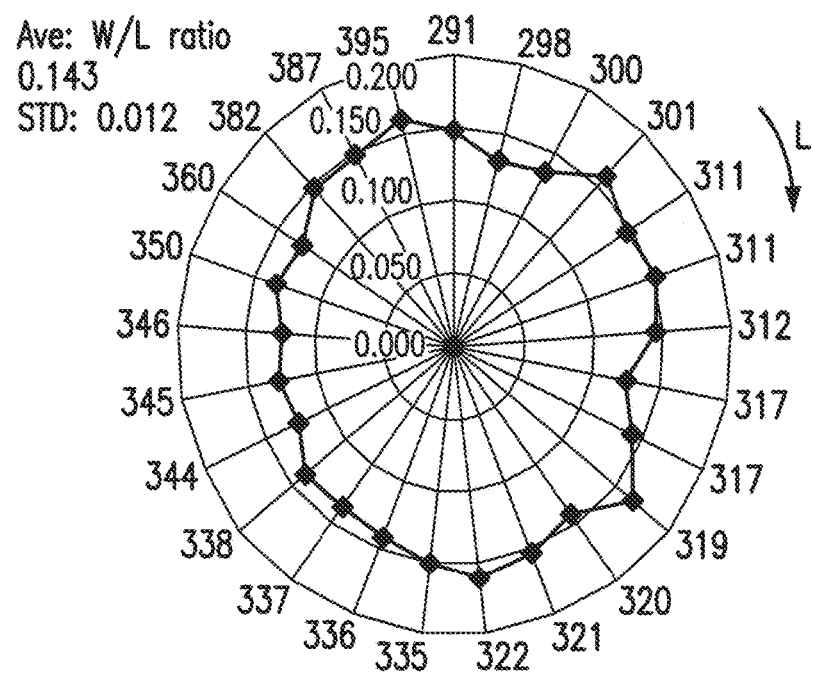
FIG. 7 is a diagram representative of the preliminary result plot of widths W to lengths L ratio of the crab body.

Preliminary studies resulted in the finding that distance (L) between two knuckles and distance (W) between the mid-point of the junction cartilage and the knuckle line 102 (shown in FIG. 6) have a fixed proportional relationship. As FIG. 7 shows, in 25 crabs of both sexes, the knuckle length L ranges from 291 pixels to 395 pixels with pixel resolution 0.2 mm/pixel. However, L/W ratio remains almost unchanged, with the average value of 0.143 and the standard deviation of 0.012.

In the present system, a template matching routine is used to generate the cutline in the XY plane, based on the crabs morphological information and the knuckle locations acquired via the subject imaging method.

In the digital crab images, the knuckles are small and amorphous objects. Small object detection is challenging, since there may be overwhelming misleading objects. The basic solution to this detection challenge may be transformation of a global detection problem into a local detection problem. In the subject system, a localization process is used which rules out a large percentage of noise and offers a rough target region where small objects are much easier to detect.

The localization strategy may be based on human experience. However, such approach is not reliable. For this reason, the present algorithm 59 uses a sliding window routine to slice the picture (image) into small pieces (sub-images, or regions) and subsequently design a classification model to determine the presence of a target object (back-fin knuckle) in each small sub-image.

The classification model in question is contemplated to accept various features related to the small target as an input, including color, shape, or both.

Conventional classification models may be used which may include principle component analysis (PCA), support vector machines (SVM), and discrimination models. Artificial neural networks (ANNs) are another classification model acceptable for the subject system.

Convolutional Neural Networks (CNNs) model which improves the traditional ANNs classification models, is considered for application in the subject system 10. The CNN classification model uses the internal properties of the 2D images and shares weights to avoid the overfitting problem to some degree.

With the development of highly powerful and efficient Graphic Processing Units (GPUs) and the advent of deep networks, the CNNs alter the track of computer vision development. CNNs utilize numerous (millions) of hidden features to achieve complicated image analysis tasks. Region-based CNNs and versions thereof have been widely used in the object detection area in recent years to find a particular set of objects in an image. However, the performance of CNNs is highly dependent on the image training dataset. Lack of a sufficient training data volume in specific area may hamper CNNs application in the industry.

The subject system and method support the steps of: (a) crab image acquisition, (b) image processing, (c) knuckle sub-image dataset preparation, (d) network training and validation, (e) final knuckle positions determination, and (f) cutline generation in the XY plane.

Figure 1C:
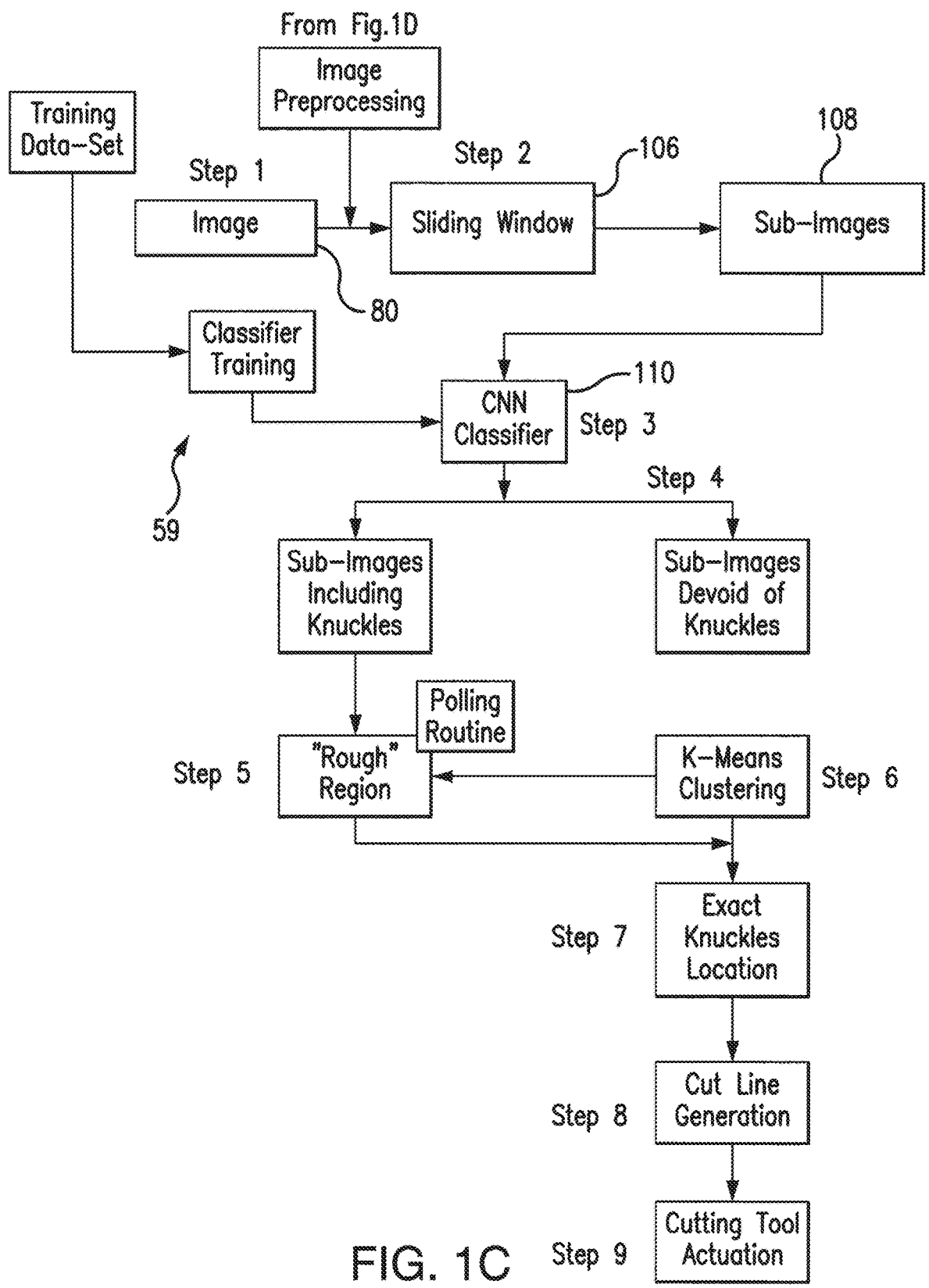
FIG. 1C is a flowchart diagram of execution of the routine for crab cutline generation based on the back-fin knuckle determination.

In the present system 10, as shown in the flow chart depicted in FIG. 1C, the computer system 56, and specifically the image processing sub-system (algorithm) 59, operates in accordance with a knuckle detection neural network which is established for the subject system. In accordance with the knuckle detection neural network technique, an RGB image 80 is acquired in step 1. Sliding window 106 slices the raw crab images 80 into thousands of sub-images (regions) 108 in step 2. The CNN classifier 110 is subsequently applied in step 3 to determine whether a sub-image 108 includes a knuckle or is devoid of the knuckle.

If the sub-image is determined in Step 4 to contain a knuckle, the CNN classifier localizes a rough region for it in Step 5. To obtain exact knuckles positions in Step 7, an additional k-means clustering routine is applied in Step 6 to the rough region in order to cluster pixels in the rough region based on their color.

The exact position generated in Step 7 is subsequently used in Step 8 for the cutline generation, which, in its turn, is supplied to the control sub-system 60 for the cutting tool actuation in Step 9.

Statistical data will be presented in the following paragraphs to demonstrate the results of the subject CNN-guided knuckle detection routine. The sub-image classification accuracy attained in the subject system is comparable with SVM and ANN methods. The final detection performance after k-means clustering is compared with clustering results based on traditional localization method established upon human-level assumptions and complex blob analysis.

Experiment Material and Image Acquisition

As shown in FIGS. 1A-1C, and 3-4, the experiment objects (blue crabs) 26, were steamed and cooled to solidify protein according to the current industrial practice. Crabs were all de-backed to remove the top shell and internal organs. For the material handling, a mesh conveyor 12 (manufactured from a food grade stainless steel) was driven by a servomotor 28 running in step motion with a constant step size. The computer system 56, specifically, the image processing software 58, controls the step number (e.g. 200 mm per crab pitch, with no crab overlap). Thus, the computer system 56 is current with the exact position of each crab 26 on the conveyor belt 12.

The mechanical operation sub-system 62 included a set of waterjet knives with a stream of 1 mm at 30,000 PSI, which makes sharp and fine bladeless cuts.

The basic concept supporting the knuckle segmentation approach is the use of the red color information to separate the knuckles from the crab body. However, as knuckles are small objects relative to the whole image, a localization strategy is needed in advance to determine a rough knuckle region and to avoid the obfuscating objects such as eggs and legs. In the rough knuckle region, pixel-level clustering based on red color information extracts the final knuckle location.

For knuckle localization, the easiest procedure is to manually set up standards. For example, it can be assumed that knuckles will be located near the crab-background boundary. Every crab usually has two knuckles, and they have a particular distance to the crab centroid. Most of these standards rely on human assumptions and are unreliable. The localization results usually are unable to ensure that a knuckle is the main part of the region and other red objects may still exist in the region.

An alternative concept for localization of the knuckles, used in the subject system, is to train a classifier to point out whether the detected object is in a region. In this implementation of the subject system, the binary knuckle detection classifier is trained by thousands of sub-images, both including knuckle and devoid of non-knuckle sub-images. The size of sub-images is predetermined to be larger than the size of the back-fin knuckles. The size of the sub images also is chosen to ensure that the knuckle can be the key part in the sub-image. In the experiment and studies of the subject system performance, the size of sub-images was chosen to be is 81 pixels×81 pixels, with a pixel resolution of 0.2 mm×0.2 mm per pixel.

After obtaining the rough knuckle positions in Step 5 (shown in FIG. 1C), a pixel-level clustering routine (in Step 6 of FIG. 1C) is applied to determine the final knuckle position. In the experiment, a k-means clustering routine is applied to a* channel values in the L*a*b* color space.

K-means is a reliable clustering method and has been widely used for image segmentation. The parameter selections of the k-means routine will be detailed in further paragraphs. The L*a*b* color space is a machine-independent color space, which can be transformed from the RGB color space non-linearly. The a* value in L*a*b* color space is more sensitive to red and green. A typical a* channel image of background-removal crab is depicted in FIG. 8.

Figure 1D:
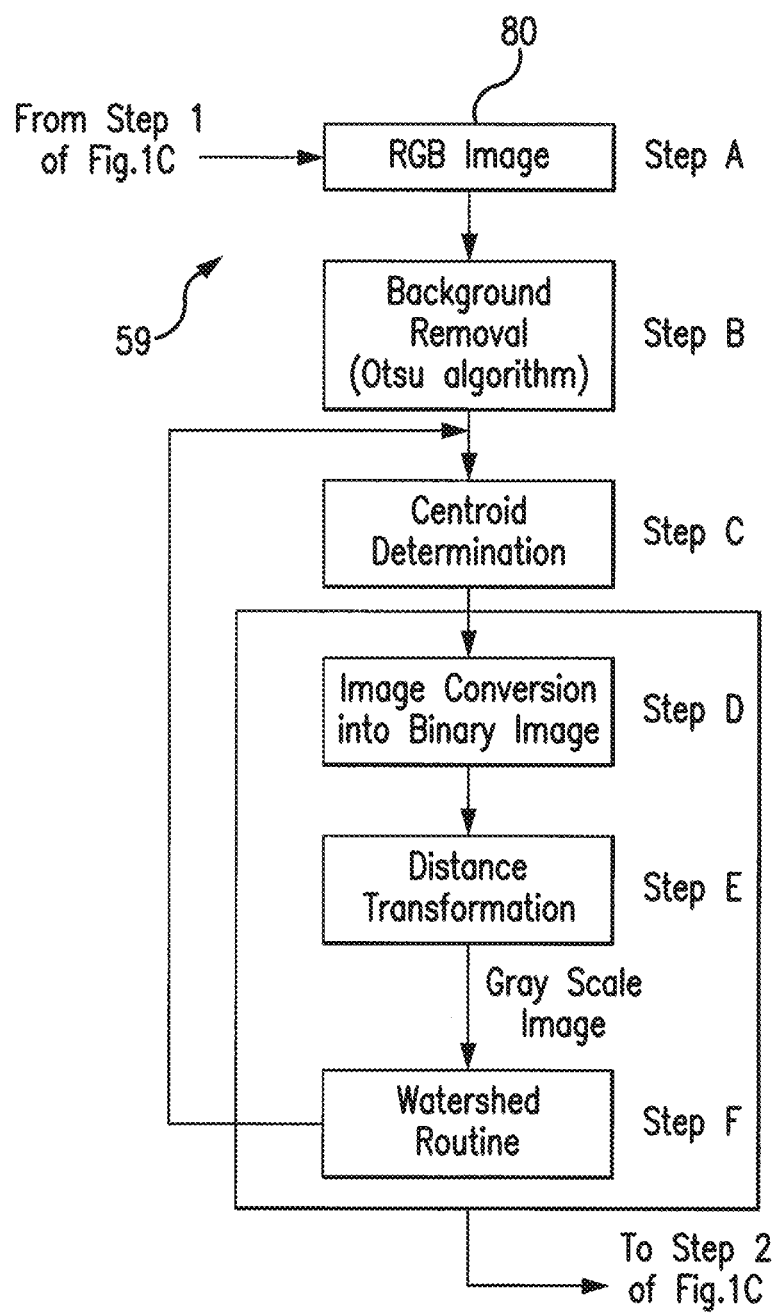
FIG. 1D details the image pre-processing routine for the crab cutline generation process based on the back-fin knuckle determination.

Image preprocessing, as shown in FIG. 1D, includes background removal (in Step B) and main body centroid determination (in Step C) of the image acquired in Step A. The conveyor background needs to be removed to simplify the subsequent training procedure. The crab body centroid can be used to separate the crab into two parts, ensuring that the subject CNN model can find the left and right knuckle regions separately.

For the background removal, the Otsu algorithm is applied. The Otsu algorithm automatically determines a threshold to separate the conveyor belt and the crab body. The saturation value of the conveyor belt is much lower than the saturation levels for a crab. The Otsu algorithm operates to maximize the inter-class variance based on the saturation gray scale histogram, and divides the pixels into two classes. A typical image after the conveyor belt background removal is shown in FIG. 9.

To determine the crab body centroid in Step C (of FIG. 1D), the legs are removed in advance because the crab is not always ideally symmetric. To achieve leg removal, the images are initially transformed into a binary image in Step D. Subsequently, in Step E, a distance transformation on the binary image generates a gray scale image whose pixel values describe the distance between a specific pixel and the closest background pixel, as shown in FIG. 10A.

Finally, the watershed routine is applied to the distance transformation result in Step F. The principle of the watershed algorithm is to merge pixels with similar gray scale value into a group. In this application, because the leg pixels are closer to the background than the crab body pixels, the watershed method based on the distance transformation results in a specific grouping for the crab body, as shown in FIG. 10B. The crab centroid 112 is shown in FIG. 9.

Some other alternative image processing methods could also be able to remove the leg. However, in this case, accurate leg removal and centroid location are not necessary for following processes, and the updated centroid located between two knuckles is good enough for the following work.

CNN Based Crab Knuckle Localization

Dataset Preparation

Ninety full-sized (1200×800 pixel) background removed RGB crab images were used with a pixel resolution of 0.2 mm×0.2 mm per pixel in the training dataset. Another set of 43 full-sized background removed images from a different batch of crabs were used for comparison. Using a different batch of crabs for the comparison images can validate the generalization of the classification model effectively.

All 133 images were knuckle-labeled. Particularly, other leg and crab core joints were also marked with a different label, which was helpful in the subsequent sub-image selection operation. An 81 pixels×81 pixels sliding window sliced the full sized image into small sub-images (regions). The size of the sliding window was determined by the actual knuckle size in the raw image. It should be larger than the size of knuckles, but it also needs to ensure that the knuckle is the key part in the sub-image. The application of the sliding window started from the (0,0) pixel of a full sized image and moved in X/Y direction with the stride of 5 pixels.

All sub-images were classified into three types intuitively, i.e., the background (all black pixels), the crab (all color pixels), and the boundary (including both color and background pixels). Knuckles always belong to boundary sub-images, and thus background and crab sub-images were discarded, and were not included in the training and test datasets.

For the boundary sub-images, the ones with more than 80×40.5 color pixels were regarded as effective sub-images, because the opposite case cannot ensure the knuckle is the main part of the sub-image. Therefore, the opposite cases were also completely discarded in advance and were not included in the training and test dataset.

Returning to FIG. 1C, the remaining sub-images, defined as the effective sub-images, were further classified in Step 4 into two types, i.e., (a) knuckle sub-images, and (b) non-knuckle sub-images. The sub-image with the knuckle area larger than 0.75 times corresponding knuckle area in the ground truth images was defined as a knuckle sub-image, and the ones which did not satisfy the knuckle area requirement were defined as non-knuckle sub-images. The target of the subject CNN model was to execute the binary classification of the knuckle sub-images and non-knuckle sub-images.

The dataset generated from the above process still had multiple times more of non-knuckle sub-images than the knuckle sub-images. To ensure the training set has a comparable scale of positive and negative training samples, some non-knuckle images were discarded. Instead of discarding randomly, a larger percentage of non-knuckle images with leg and crab core components were kept, and a smaller percent of images with only meat or only leg components was kept. This process was implemented with the formally mentioned leg and crab core joint labels. This strategy permits the obtaining of better test results when new images are obtained. The final dataset included 21,509 knuckle sub-images and 50,021 non-knuckle sub-images.

In the model training procedures, the sub-images generated from 68 full-sized training images (75% of 90 images in training dataset) were used for training. The sub-images from 22 full-sized training images remaining (25% of 90 training image) were used for validation.

CNN Architecture and Network Training

The basic idea of CNN architecture is to utilize hundreds of convolutional filters to describe hidden features in an image. Modern CNN architectures integrate convolutional layers with maxpooling layers and rectification linear unit (ReLU) layers, establishing the idea of a Deep Neural Network.

In the CNN architecture 59 (shown in FIG. 1A), convolutional layer (filtering) routine is used for features extraction. Maxpooling is used to conduct down-sampling to decrease the side effect of overfitting and to save storage space. ReLU layers can increase the non-linearity of the model.

The mathematic expression of the three layers is shown in Eq. 1, where K is a (2N+1)×(2N+1) filter matrix and I represents a sub-image sample.

Generally, CNN architecture is equipped with a couple of fully-connected layers to perform the final classification, similar to the traditional ANN model $$\text{filtering}: I(i, j) = \sum_{p,q=-N}^{N} I(i+p, j+q) \times K(N+p, N+q) \quad \text{(Eq. 1)}$$

$$\text{maxpooling}: I(i, j) = \max_{p,q=-N}^{N} I(i+p, j+q)$$

$$\text{ReLU}: I(i, j) = \max(I(i, j), 0)$$

The subject CNN architecture follows the idea of the VGG model developed by the Visual Geometry Group of University of Oxford. It uses 3×3 convolutional filters in each layer instead of larger filters to construct a deeper network. The subject network architecture is shown in Table 1. In the experiment, some classical AlexNet, GoogleNet, VGG and ResNet was used. For each network, different number of layers, different number of convolutional filters and different size of convolutional layers were tested. There were no obvious differences among the best results of the different models. The presented architecture shows the best experimental result.

In the training procedure, adaptive gradient descent is used to minimize the cross entropy (training loss) as Eq. 2 shows, where y' is the true distribution and y is the predicted probability distribution.

In the binary classification application, for non-knuckle sample, y' is [1, 0], and for knuckle detection, y' is [0, 1], where y represents the probability of two classes, which was computed by sigmoid function.

The learning rate was set as 0.001, and it automatically decreases based on past gradients without additional parameters needed.

TABLE 1

Knuckle detection CNN architecture

| Layer | parameters | Output size |
|---|---|---|
| Input Data | N/A | 81 × 81 × 3 |
| Conv 1 | kernel size: 3, stride: 1 | 79 × 79 × 64 |
| Conv 2 | kernel size: 3, stride: 1 | 77 × 77 × 64 |
| Conv 3 | kernel size: 3, stride: 1 | 75 × 75 × 64 |
| Conv 4 | kernel size: 3, stride: 1 | 73 × 73 × 64 |
| Max Pool 1 | kernel size: 2, stride: 2 | 36 × 36 × 64 |
| Conv 5 | kernel size: 3, stride: 1 | 34 × 34 × 128 |
| Conv 6 | kernel size: 3, stride: 1 | 32 × 32 × 128 |
| MaxPool 2 | kernel size: 2, stride: 2 | 16 × 16 × 128 |
| Conv 7 | kernel size: 3, stride: 1 | 14 × 14 × 256 |
| Conv 8 | kernel size: 3, stride: 1 | 12 × 12 × 256 |
| FC 1 | N/A | 2048 |
| FC 2 | N/A | 2048 |
| FC 3 | N/A | 2 |
| Compute the loss and accuracy | | |

$$H_{y'} = \Sigma y' \times \log(y) \quad \text{(Eq. 2)}$$

Figure 11:
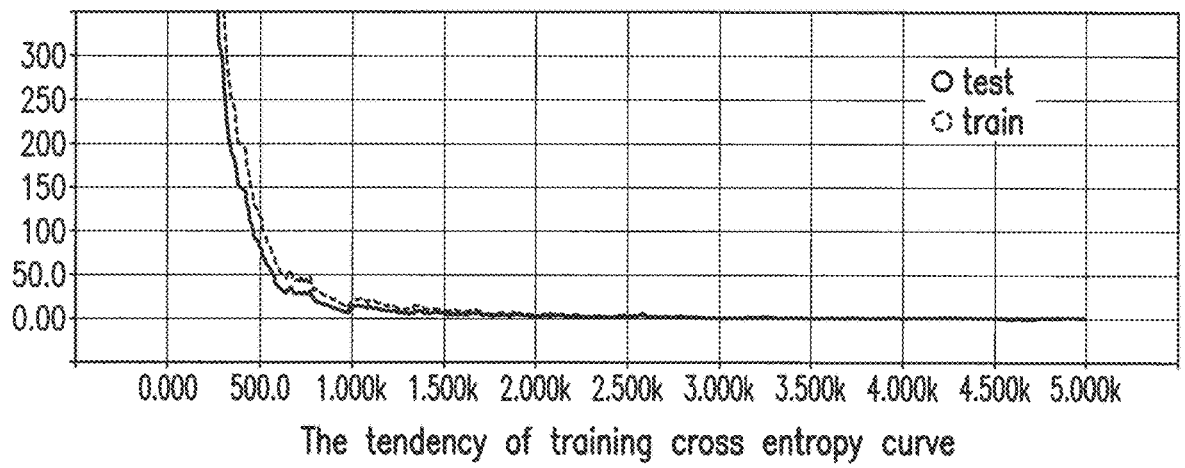
FIG. 11 is a diagram representing the tendency of training cross entropy curve.
Figure 12:
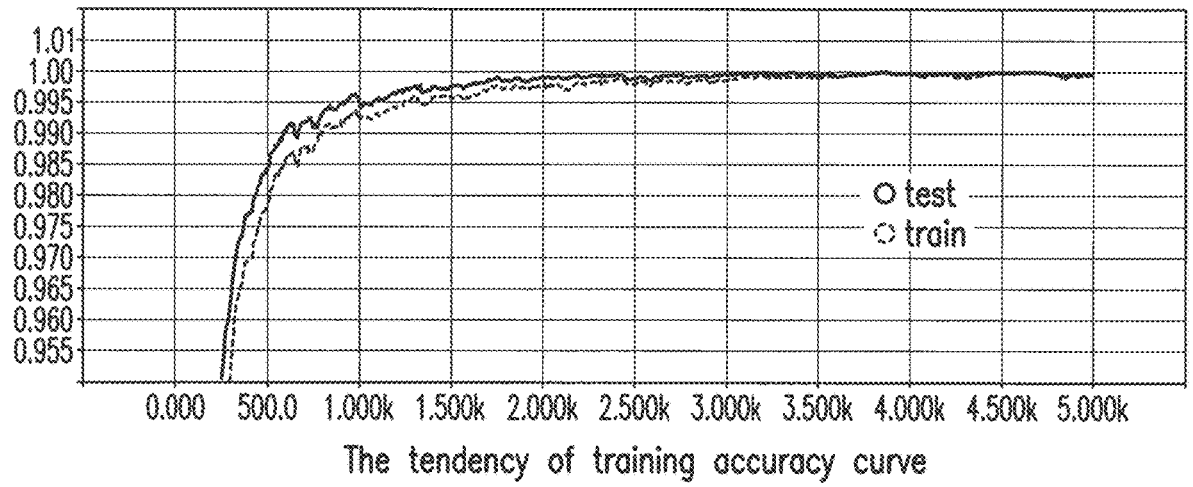
FIG. 12 is a diagram representative of the tendency of training accuracy curve.

The batch size for training was 256, and the network converged after 5,000 iterations. The cross entropy and curve accuracy are shown in FIGS. 11 and 12, respectively.

The training accuracy may float up and down for every training step, but the general tendency is going up. On the contrary, the cross entropy (loss) goes down. 99.6% training accuracy and 98.7% validation accuracy were attained. The CNN architecture was implemented in both caffe and tensorflow with a Nvidia GeForce Titan X GPU.

Polling and the Rough Knuckle Position Determination

After the CNN model is well-trained, the rough knuckles positions in full-sized test images are ready to be determined in Step 5 of FIG. 1C.

For a new crab image, all preprocessing procedures were performed in advance. In the test phase, an 81×81 sliding window was still needed to slice the test images into sub-images, and the subject CNN model just validated whether an effective sub-image contained a knuckle or was devoid of the knuckle.

The size of test crab image was 800×1200, and the test sliding window started from the coordinate (0, 0) to (720, 1120) with a 5-pixel stride at both x and y axes.

The subject CNN model can obtain 99% training and validation accuracy. However, both of the accuracy values are based on sub-images 108 (shown in FIG. 1C). When testing a new image, thousands of sub-images need to be classified. A 1% error can lead to about 10 incorrect prediction cases.

To rule out the incorrect prediction cases, an additional polling routine was applied in Step 5 (shown in FIG. 1C). In this step, a weight map W is constructed to record the CNN validation results, which has the same size of raw image (800 pixel×1200 pixel). The detailed weight update rule is: if the sub-image belongs to non-effective sub-images and effective non-knuckle sub-images, the weight map will not change. On the contrary, if the sub-image is a knuckle image, the weight map should be updated based on the probability results from sigmoid function. Eq. 3 offers the mathematic expression of this process, where W is the weight map, E is an all-one matrix with size of 800×1200, and I is the background removal image.

$$W(i:i+80, j:j+80) = \begin{cases} W(i:i+80, j:j+80) + P(\text{knuckle}) \times E & I(i:i+80, j:j+80) \in \text{knuckle} \\ W(i:i+80, j:j+80) & I(i:i+80, j:j+80) \notin \text{knuckle} \end{cases} \quad \text{(Eq. 3)}$$

Figure 13:
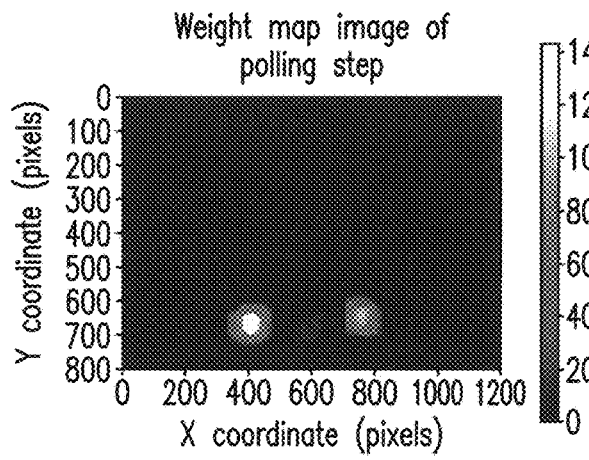
FIG. 13 is the image of the polling weight map.
Figure 14:
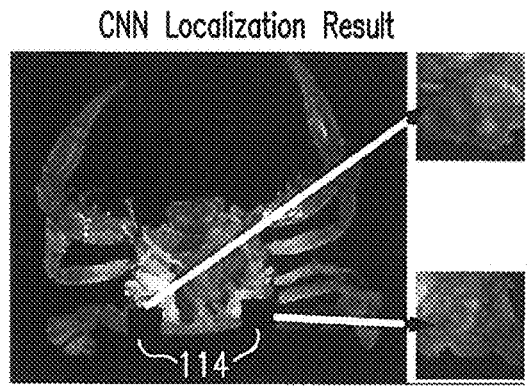
FIG. 14 is the resulting image of the CNN-based back-fin knuckles localization.

FIG. 13 shows the weight map image in the polling step. The regions with higher value are more likely to be the knuckle region. Based on the crab body centroid, an 81×81 region with largest mean weight value can be found at the left and right separately. The two regions are regarded as the rough positions of left and right knuckles, as the parts 114 shown in FIG. 14. The wrong prediction cases can easily be detected and ruled out via the additional polling step.

K-Means Clustering in Rough Knuckle Region

K-means clustering is a classic unsupervised learning method, which operates to cluster pixels based on minimizing the total within-class distance, which is expressed in Eq. 4, where k is the number of clustering types, x is a d-dimensional feature vector, and $u_i$ is the mean vector in each group.

$$\arg\min_S = \sum_{i=1}^{k} \sum_{x \in S_i} \|(x - u_i)\|^2 \qquad \text{(Eq. 4)}$$

Figure 15:
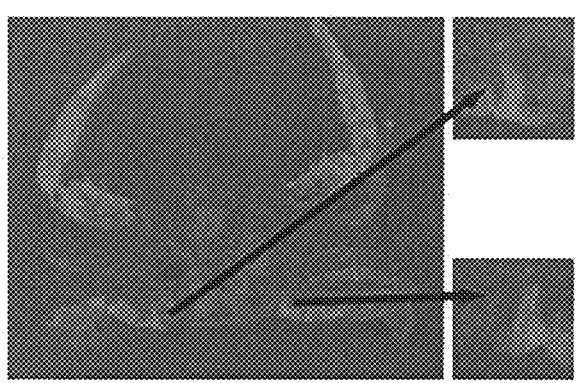
FIG. 15 shows an a* channel image with rough knuckles localization.

The a* value in L*a*b* color space is a sensitive feature to describe knuckle colors, as shown in FIG. 15. Two small images in the image correspond to the rough positions detected from the CNN model. Compared to other parts in the sub-images, knuckles have the largest a* value.

In the experiment, binary k-means clustering routine in a* channel twice was executed in Step 6 (shown in FIG. 1C) to obtain the final (exact) knuckles positions. The first k-means can split crab-leg (including knuckles) and crab body apart. The second k-means is optional, which aims to further split crab-leg and knuckle apart. In the second clustering step, if the distance between the mean a* value of two classes is larger than 10, the clustering result would be preserved, otherwise, they would be discarded.

Figure 16:
FIG. 16 is representative of a final knuckle detection result.

The final knuckle segmentation results generated in Step 7 of FIG. 1C are shown in FIG. 16. Basic morphological operators can be applied to smooth the knuckle blobs.

Template Matching Based on Knuckle Location

Figure 17:
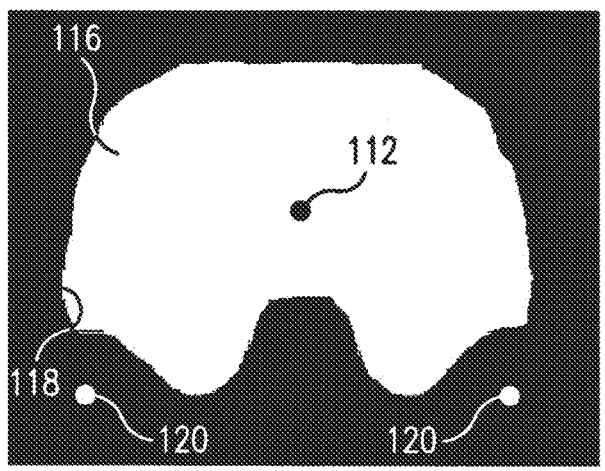
FIG. 17 is an image produced by the cut line template routine.

Based on the fact that different crabs share a similar morphological structure, as shown in FIG. 8, a cutline template 116 was created by manually drawing the desired cutline on a crab, as shown in FIG. 17. The cutline template 116 includes the cutline 118, two corresponding knuckle positions 120 in the template 116, and the centroid 112 of template 116. The template was transformed to match different crabs based on the knuckle location generated by execution of the K-means clustering routine in Step 6 (shown in FIG. 1C).

Figure 18:
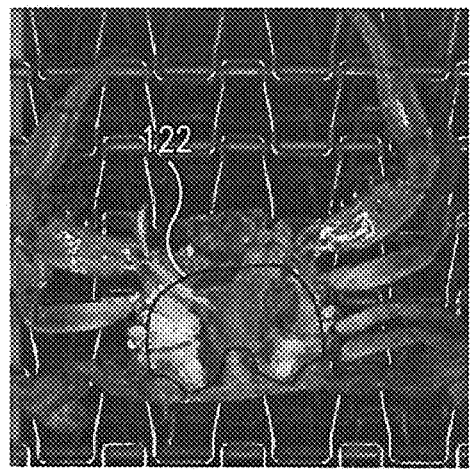
FIG. 18 is an image depicting a cutline generated from a template matching routine.

The template matchings needs the execution of three sequential routines, i.e., rotation, scaling and translation. First, the rotation, based on the Eq. 5 is performed. Then scaling is performed, based on Eq. 6. To simplify the process, the coordinate was transformed to the polar coordinate, and the scaling was executed by multiplying r the radius (in polar coordinates) by d, and the coordinate was changed back. Finally, the translation was conducted based on both the left knuckle and right knuckle via computing the average translation distance. The cutline 122 generated from the template matching in Step 8 of FIG. 1C is shown in FIG. 18.

Rotation:

$$x_r = (x-c_x)\cos\theta - (y-c_y)\sin\theta + c_x$$

$$y_r = (x-c_x)\sin\theta + (y-c_y)\cos\theta + c_y \qquad \text{(Eq. 5)}$$

Scaling:

$$x_s = r \times \tan^{-1}\left(\frac{y_r}{x_r}\right) \qquad \text{(Eq. 6)}$$
$$y_s = r \times \tan^{-1}\left(\frac{y_r}{x_r}\right)$$
$$r = \sqrt{x_r^2 + y_r^2} \times |d|$$

where, the rotation factor θ is determined by the angle between the template knuckle line and the knuckle line, d is the ratio of the template knuckle line to the knuckle line, (x, y) is a point in the template image, ($x_r$, $y_r$) is the coordinate after rotation, ($x_s$, $y_s$) is the coordinate after scaling, and ($c_x$, $c_y$) is the coordinate of the template centroid 112.

The cutline template was generated based on the preliminary studies presented in previous paragraphs. In the crab industry, there is no standard to qualify the quality of the cutline ground truth. The resolution of the subject waterjet system is 1 mm, which permits 5 pixels error in images. With the cutline in the XY plane, the present system opens the chitin walls to expose the jumbo meat for picking.

The subject CNN-based knuckle determination approach was tested on the prepared test dataset, which included numerous full-sized images. The sub-image classification ability of the subject CNN model was validated, and its performance was compared with the traditional SVM model and the ANN model.

Ten thousand (10,000) test sub-images were generated from the 43 images in accordance with the procedure presented in the previous paragraphs for the training dataset. Only boundary sub-images were included in the test dataset, instead of the background and crab sub-images. In the test dataset, the ratio of positive sample and negative sample followed the values in the training dataset, which can reflect the ratio in real applications.

The SVM and ANN models were trained by the same training dataset on 90 images. To avoid the overfitting problem of the SVM and ANN models and to accelerate the training process, the Principle Component Analysis (PCA) was conducted on the image data in advance, and the first 500 components were chosen to describe the image features. For the SVM, three common kernels, including the polynomial kernel, the Gaussian kernel and the sigmoid kernel, were tested separately. After adjusting the free parameters in the three kernels, experiments showed the Gaussian kernel obtained the best result, with 96.7% training accuracy and 88.1% test accuracy.

For the ANN model, the number of hidden layers was set as 1 to 3 separately. Experiments showed a two-hidden-layer network with 20 and 5 neurons in each hidden layer can achieve the best balance between the training and test accuracy, with 95.2% training accuracy and 85.7% test accuracy.

There were 86 knuckles in the 43 test images. After the polling process, the rough knuckle determination accuracy of the CNN model reached 97.67. Compared to the manual localization process, the method demonstrates great advantages.

In the manual localization process, background removal and watershed-based leg removal is conducted in advance, and an assumption is made that knuckles are located near the lower boundary of the crab body. In practice, the distance computation is achieved by a KD-tree data structure. In this region, binary k-means clustering on a* channel is applied once to rule out crab body pixels. Remaining regions include back shell, knuckles, and legs. Based on the constraints of blob size, distance to the crab centroid, and blob eccentricity, two regions can be selected as the left and right knuckles, and the final localization accuracy can be 82.56%, which is inferior to the CNN based localization.

A qualification experiment was conducted to describe the final knuckle segmentation result. A Jaccard index J(A, B) was defined as the metrics, whose mathematic expression is presented in Eq. 7. Where, A is the segmentation result in the present method, B is the segmentation ground truth, and the cardinal number of a region represents its area.

$$J(A, B) = \frac{|A \cap B|}{|A \cup B|} \quad \text{(Eq. 7)}$$

Applying k-means clustering, presented in the previous paragraphs, on the 84 correct rough knuckle regions acquired by the subject CNN model, every region attains a Jaccard value, and the average is 0.91. Because the subject clustering routine is the pixel based clustering, it may be affected by some impulse noise. However, a 0.91 Jaccard index is sufficient enough to obtain the cutline determination.

Figure 19:
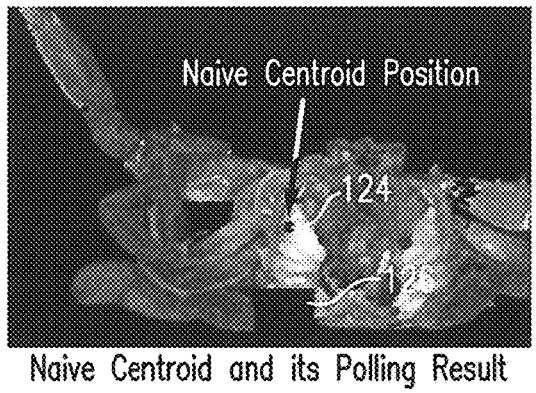
FIG. 19 is an image of the naïve centroid and its polling result.

As shown in FIG. 1D, the watershed algorithm was applied before determining the crab centroid. The reason for executing this is that, in practice, the crab in the digital images is not always ideally symmetric. Some crabs miss one side of their legs in the image, but keep the other side. It can happen naturally or during the manually crab loading process. FIG. 19 shows one of the wrong cases, and the dot 124 is the naïve centroid position. Because the polling routine and clustering routine process right and left knuckles separately, the naïve centroid position 124 can lead to the overlapping of left and right knuckles 126. In 43 test images, six could not obtain the correct rough knuckle positions due to the inaccurate centroid.

Figure 20:
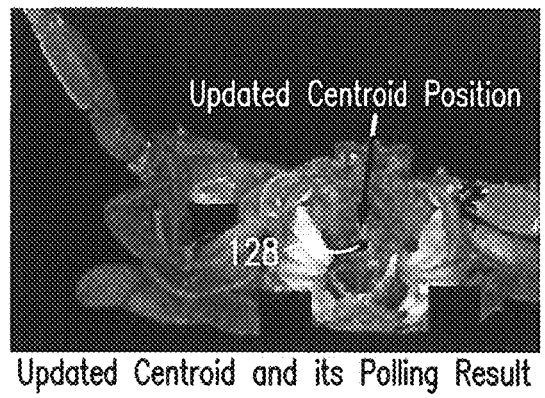
FIG. 20 is an image of the updated centroid and its polling result.

The watershed algorithm can effectively eliminate the problem, as shown in FIG. 20. In the subject test dataset, the watershed routine successfully avoided the side effect of the naïve centroid. However, in theory, the watershed cannot remove the leg accurately. It can just make use of the gap between the legs to remove the asymmetry of the crab. The average distance between the updated centroid and the labelled centroid is (12.37, 11.94) pixels with standard derivation (7.97, 8.36) pixels, which performs better than the naïve centroid. The maximum distance between the updated centroid 128 and the labelled centroid is 32.48 pixels, which still locates in two knuckles. In addition, one of the advantages of the CNN model is that it is not dependent on the exact central position.

In extreme cases, for example if there are bodies which have a comparably low saturation value with the background and are connected to the background, the watershed method may fail and would split the crab body into two or more pieces. In the present test dataset, this condition does not exist, since the crab pixels and conveyor belt pixels show significant differences in saturation channel, and the background removal routine demonstrates a high precision with a 0.97 Jaccard value (Eq. 7).

In practice, the light source and camera settings need to be adjusted in different work environments. If the watershed fails, the crabs need to be rejected and be reprocessed to clean the dirt manually.

The Strategy for Training Data Preparation

When preparing the training dataset, some negative samples should be discarded to obtain a comparable negative (non-knuckle sub-images) and positive (knuckle sub-images) sample. Non-effective sub-images can be discarded. For effective sub-images, they can be divided into three types, only the background (type 1), only the crab body and background (type 2), and leg, body and background (type 3).

All type 1 and 2 sub-images are negative samples, and the type 3 images comprise both negative samples and positive samples. To a classification machine, the type 3 sub-images are more likely to produce the false positive cases when new test images are attained, which can further affect the determination of the rough knuckle positions.

Figure 21:
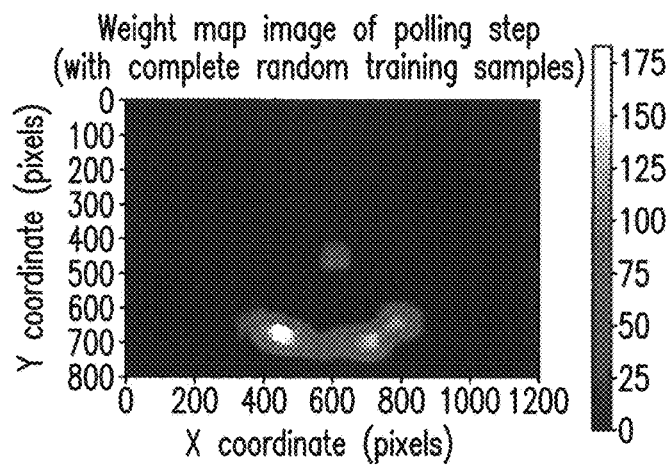
FIG. 21 is the image of polling weight map using the CNN model trained by completely random non-knuckle samples.

Instead of discarding non-knuckle sub-images randomly, more negative samples belonging to type 3 tend to be kept. The weight map in the polling step is shown in FIG. 21. Compared to FIG. 13, it is obvious that the crab carapace at the bottom highly mislead the polling process.

Selection of k-Means Parameters

In general, the clustering method results rely greatly on the selection of features and the relationships among different features. The representativeness and robustness of features are the key factors to obtain the ideal clustering results. In the subject knuckle detection application, the a* channel in L*a*b* color space is the most reliable feature to describe the knuckle pixels compared to RGB values.

Figure 22:
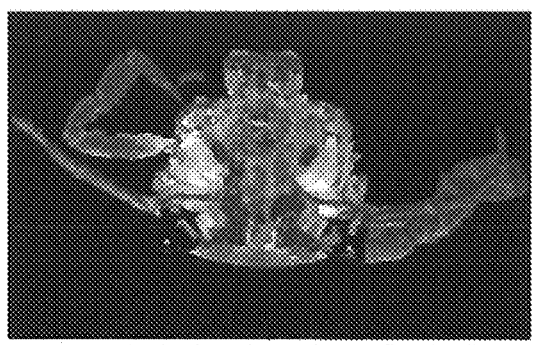
FIG. 22 is an image resulting from the K-means clustering routine based on RGB (red-green-blue) value.
Figure 23:
FIG. 23 is an image resulting from the K-means clustering routine based on a* value.

There are two potential problems in considering the R, G, B values as clustering parameters. The R, G, B values of the crab body pixels in sub-images are very random. They could be very dark or very bright, and thus can affect clustering results. FIG. 22 shows an example when the k-means clustering is applied based on R, G, B values. However, to the same image, clustering based on a* channel can solve the problem, as shown in FIG. 23.

The second critical problem accompanying the RGB based clustering is that when the clustering is finished, there is not a reliable way to determine which class represents the knuckles. However, if the clustering is based on a* value, it is always true that the class with largest a* value represents the knuckle.

To determine the number of clustering classes in the a* based clustering, an additional experiment was conducted based on the subject dataset. There are three possible parts in the rough knuckle position including the leg, the knuckle, and the crab body. Knuckle pixels have the highest a* value, legs are middle, and crab body has the lowest a* value. The a* value differences between knuckle and crab body are obvious, but between the knuckle and the leg are insignificant.

To choose adequate clustering classes, single 2-class clustering and single 3-class clustering were validated. 2-class clustering means all the pixels in the rough knuckle region would be clustered into two classes. Single 2-class clustering separate the crab main body pixels from others. Similarly, 3-class clustering was expected to separate the leg, the knuckle and the crab main body apart. Between the 2-class clustering and the 3-class clustering, 2-class clustering performs better, In order to execute the segmentation routine more precisely and to further separate the knuckle pixels from the trivial leg pixels, the second 2-class clustering was conducted based on the first clustering result and returned the class with highest a* value. The main problem of performing 2-class clustering is that it can result in some over segmentation cases, and weaken the final performance. Therefore, the second clustering is regarded as an optional step in practice, and is conducted only when the a* value difference between two classes is far enough (>10). An average 0.91 Jaccard value can be achieved using the constrained 2-class clustering twice in the 84 correct rough knuckle regions.

Although most crabs share similar morphological structures complicated and amorphous crab components, like crab legs, crab cores, eggs, heart, and stomach, are difficult to be described via traditional image features including color and textures. The subject system, in an alternative implementation, uses the Deep Learning methodology as a powerful image processing tool. Compared to traditional image processing techniques, the Deep Learning method can extract many describable and undescribable image feature. The applications of deep learning in the agriculture area are very limited, and most research focuses on cereal and plant image classifications. However, the use of the Deep Learning concept for the crab meat picking has never been proposed in the related communities.

Figure 24:
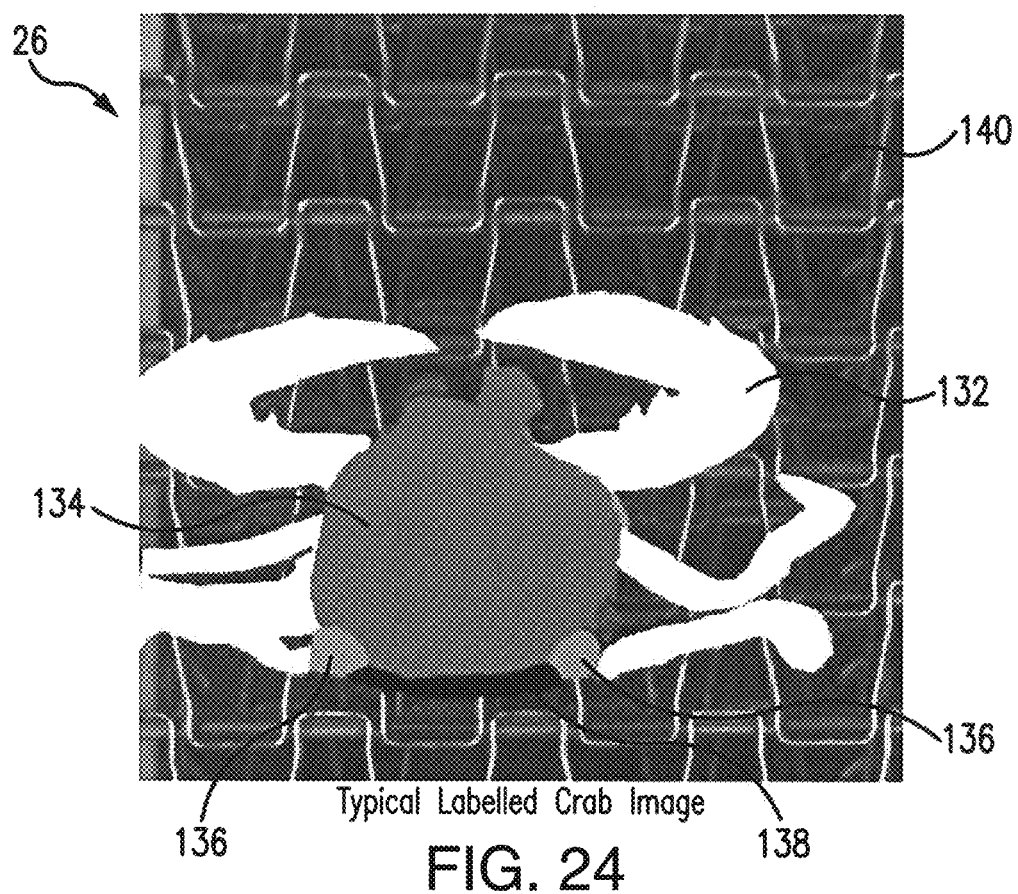
FIG. 24 is a segmented crab image using the Deep Learning segmentation model.

As shown in FIG. 1A, the Deep Learning based image segmentation architecture 130 is integrated into the subject system 10 as a part of the algorithm 58 in the computer system 56 as an alternative to the back-fin detection algorithm 59. The Deep Learning algorithm 130 takes a full-sized crab image as the network input. Following the idea of auto encoder and decoder, convolutional neural network (CNN) encodes the color image into thousands of latent features, and it is self-deconvoluted to its corresponding category labels. In the Deep Learning, a full-sized crab image is automatically segmented into 5 region of interests (ROIs), as shown in FIG. 24, including crab legs 132, crab core 134, the pair of backfin knuckles 136, crab back bones 138 and conveyor background 140. Deep learning algorithm 130 not only can guide the cutline in XY plane, but also efficiently offer very accurate crab morphology information.

The crab processing system 10 (as shown in FIG. 1A) with integrated Deep Learning Architecture 130, may comprise four stations. The first station is a dual-modality imaging station 18, which includes the RGB color imaging system 46 and the 3D laser imaging system 48. The RGB color image offers the 2D crab morphology information, including the crab size, and the crab orientation on the conveyor belt. Combining the accurate 2D information and 3D laser information, the 3D crab model is established.

Referring again to FIG. 1A, the second and third stations are two gantry systems, referred to herein as the XY/vertical cutting station 20 and the angular cutting station 22, respectively. The cutting station 20 takes the vertical cut along the lump meat walls (XY plane) to reveal the valuable jumbo meat components based on the information offered by RGB images (acquired by the CCD camera 46) with 0.2 mm pixel resolution.

The cutting station 22 performs the angular tilted cut based on 3D crab information acquired by the 3-D scanning laser system 48. The operation of the angular cutting station 22 is adapted to remove the fin chamber meat cartilage to expose small compartments hidden below the cartilages.

Each gantry station 20, 22 is mounted with a water-jet knife system 34, 36, each configured with a water-jet hose 30, 32, respectively, and having a super small water-jet nozzle (serving as a knife) that is displaceable in XYZ directions. In the exemplary implementation, the stainless waterjet nozzle 30, 32 weighs about 2 lbs, and has a small orifice (about 0.006") that ensures the high cut resolution.

The control sub-system 60 includes a set of linear motors 31, which can be digitally controlled at the motion speed of 1,000 mm/sec at 0.01 mm precision to produce cutting action for the knife 34 at the cutting station 20. An additional angular servo motor 29 is integrated in the angular cutting station 22 to actuate an angular displacement of the water-jet nozzle (knife) 36 in XYZ directions to perform angular tilt cuts.

The fourth station of the system 10 (also referred to herein as the meat removal station 24), performs meat picking by manipulating the end effectors 38, 40. For lump meat, spoon end effectors can mimic hand picking trajectory and conduct the meat harvesting from crab back-fin knuckles, which ensures the integrity of lump meat. For chamber meat, the comb like end effector is actuated to brush off the meat.

The mesh conveyor 12 is driven by the servomotor 28 running in step motion. The control sub-system 60 is adapted to control the motion of the conveyor belt 12 by number of steps in distance (for example, 6" per crab pitch, no crab overlap) in accordance with instructions generated by the image processing system 58, particularly, the Deep Learning Processor 130, embedded therein. The processor 58 knows the exact position of each object (crab) (based on the FIFO principles) at different stations.

The present design ensures that four working stations (the imaging station 18, the cutting stations 20, 22, and the meat removal station 24) cooperate in substantially parallel fashion and the stations 20, 22, 24 can share the information captured from the vision station 18.

The shaft encoder 64 provides the clock signal of the system 10, whose resolution may be, for example, 10,000 pulses/revolution. For the conveyor's shaft of 2" in diameter, the conveyor tracking resolution can reach 0.016 mm/pulse. An encoder control board (not shown in the Drawings) is plugged in a PCIe bus slot in the computer system (PC) 56 to handle the interface functions between the encoder 64 and the software 58.

Deep Learning is an emerging concept for application in an artificial intelligence area. As a branch of the Deep Learning concept, the Convolutional Neural Network (CNN) is presented in the previous paragraphs as a processing sub-system 59 of the subject algorithm 58. CNN trains hundreds of convolutional filters by itself, which enables the subject system to excavate numerous potential image features, and to combine them nonlinearly. Compared to traditional image feature operators, like HOG, Gabor, and GLCM, CNN can extract more image features. From another aspect, different from traditional artificial neural network architecture, convolution operations in CNN decreases the risk of overfitting by utilizing the image spatial information.

The on-going Deep Learning research in agriculture applications focuses on image classifications, and some applications target image segmentation. A typical CNN architecture for classification problem integrates convolutional layers to extract image features, maxpooling layers for down sampling and avoiding overfitting, and activation layers to combine image features nonlinearly. At the end of these layers, the high-dimensional image features are regarded as the input of a traditional neural network to implement image classifications, and the final output of a classification problem is a class label.

Comparatively, the result of the segmentation routine includes the localization information. Its output is expected to be an image, whose size should be the same as the input image, and each pixel of the image is assigned to a category.

Fully Convolutional Network (FCN) starts the research using CNN model to achieve the image segmentation task. It makes use of down sampling CNN architectures to extract image features. Subsequently, up-sampling strategies are applied to these features to recover a well-segmented image.

This concept originates from a special neural network named auto-encoder (AE), which is an unsupervised learning strategy. Its architecture comprises two serially connected sub-networks, i.e., the encoder network and the decoder network. The input of the encoder network is the raw data, and the outputs of the encoder network are high-dimensional data features. These data features are further fed into the decoder network, and the output of the decoder network is raw data, identical as the input of the encoder network. In essence, AE is a dimension reduction tool. It can automatically extract some low dimensional features, which can well represent the raw data.

Compared to the classic non-linear dimension reduction method, like kernel PCA, AE shows great superiority, the convolutional autoencoder is an updated version of AE, which makes use of the advantage of CNN to increase the robustness of AE.

The FCN can be regarded as a special convolutional autoencoder, but it is a supervised learning method. Instead of recovering the raw image, the output of FCN is manually labelled, well-segmented image. FCN transforms the segmentation problem into a pixel level classification problem, and every pixel in the image will be classified into a specific class. In the experiment and study of the subject system, the pixels have been classified into five classes.

Network Architecture, Dataset Preparation and Network Training

The problem of the FCN is that directly training the upsampling process is difficult without a large dataset. Research shows that, instead of the rudimentarily decoding of the image features from the encoder network, sharing some information from encoder process can improve the performance of the segmentation network.

Figure 25A:
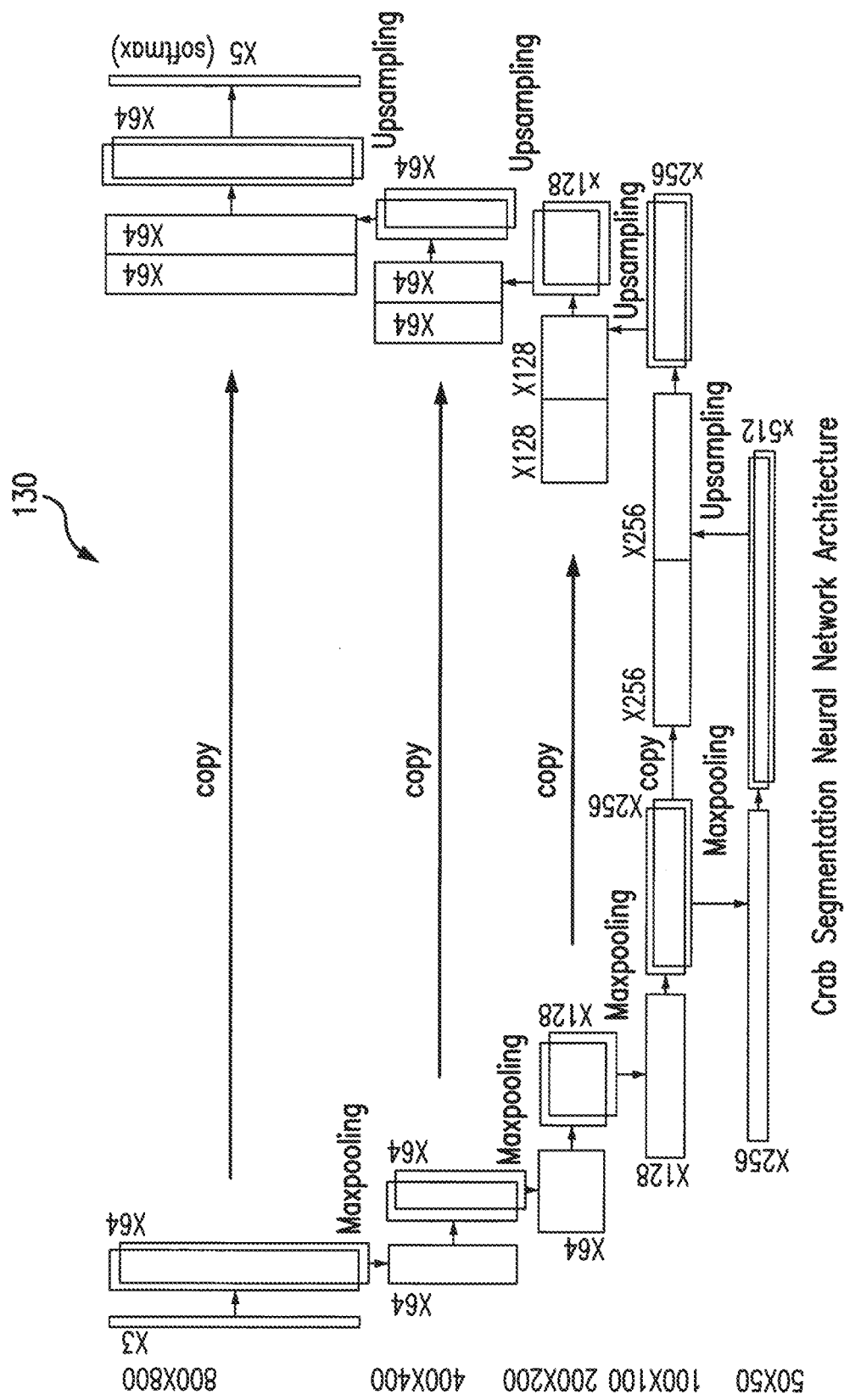
FIG. 25A is representative of the crab segmentation Neural Network architecture used for Deep Learning crab morphology segmentation.

U-net is a symmetric network architecture proposed in the medical imaging community to perform the binary cell segmentation task. The U-net copies and concatenates the features from the encoding layers to their corresponding upsampling decoding layers, as shown in FIG. 25A. The convolutional layers in the decoding process can combine the encoding and decoding information to obtain a higher decoding resolution without using a large dataset. This idea has been smoothly transferred to the subject multi-class crab segmentation application.

FIG. 25A is representative of the subject network architecture 130 for crab segmentation. There is no pre-trained model for a particular image size, and thus, the decoding network is not as deep as some current mainstream CNN models. The decoding network has same structure settings as the encoding network. To achieve the multi-class segmentation, the last layer of network is set as the softmax layer to acquire the probability that each pixel is divided into different classes.

In the experiments, 90 well labelled crab images (800*800 pixels) shown, for example, in FIG. 24, were included in the dataset. 30 images were random selected as the training dataset. 10 images were random selected as validation dataset, and the images which were left were regarded as the test dataset. To ensure the generalization ability of the network, rational data augmentation can effectively improve the training accuracy.

In the experiment, non-risky elastic deformation strategies (such as translation, mirroring, and random cropping) were directly conducted in the training and validation dataset. Some other deformation strategies (such as rotation, shear stretch, and zoom in and out) were conducted with constraint.

For the rotation strategy, because there is a mechanical component in the machine to hold down crabs, the image rotation range was set at ±25 degree. For the shear stretch strategy, which is relatively rarely implemented in practice, its range was set at ±10 degree. For the zoom in and out strategy, the crab size in the augmented images was set at ±20%.

In these methods, pixel displacements were computed using bi-cubic interpolation. Other common data augmentation operations in Deep Learning area, (such as color augmentation or contrast enhancement) were not useful because the light source of the vision station 18 is stable, the camera settings are adjustable, and the vision system needs to be corrected regularly. By random generation of the deformation parameters for a single crab raw image, 300 images were selected from the augmented images, and labelled images were deformed correspondingly. Finally, there were total 9,000 images which were used for network training. 3,000 images were used for validation, and their RGB values were normalized to 0-1 range.

The subject network was implemented using Python Keras library with Nvidia GeForce Titan X GPU. The training process used the adaptive gradient descent algorithm Adam to optimize the loss function.

The loss function, in accordance with Equation 8, was set as pixel-level categories cross entropy, where y is predicted probability distribution, generated by Softmax layer, and y' is the ground truth distribution, expressed as one-hot format with a group of bits among which the legal combinations of values are only those with a single high (1) bit and all the others low (0).

The batch size of training process was set at 4 to make full use of the graph card memory. Best model in the validation dataset was saved for a subsequent utilization.

$$H_{y'} = \Sigma y' \times \log(y) \quad \text{(Eq. 8)}$$

The crab core was XY cut at the cutting station 20. The core cut was based on the image segmentation results and was guided by a template matching concept detailed in previous paragraphs.

Deep Learning segmentation model 130 is integrated into the crab processing system 10. The Deep Learning segmentation architecture 130 may operate as an alternative mode of operation to the knuckle localization processing approach 59, or both modes of operation may be used.

Figure 25B:
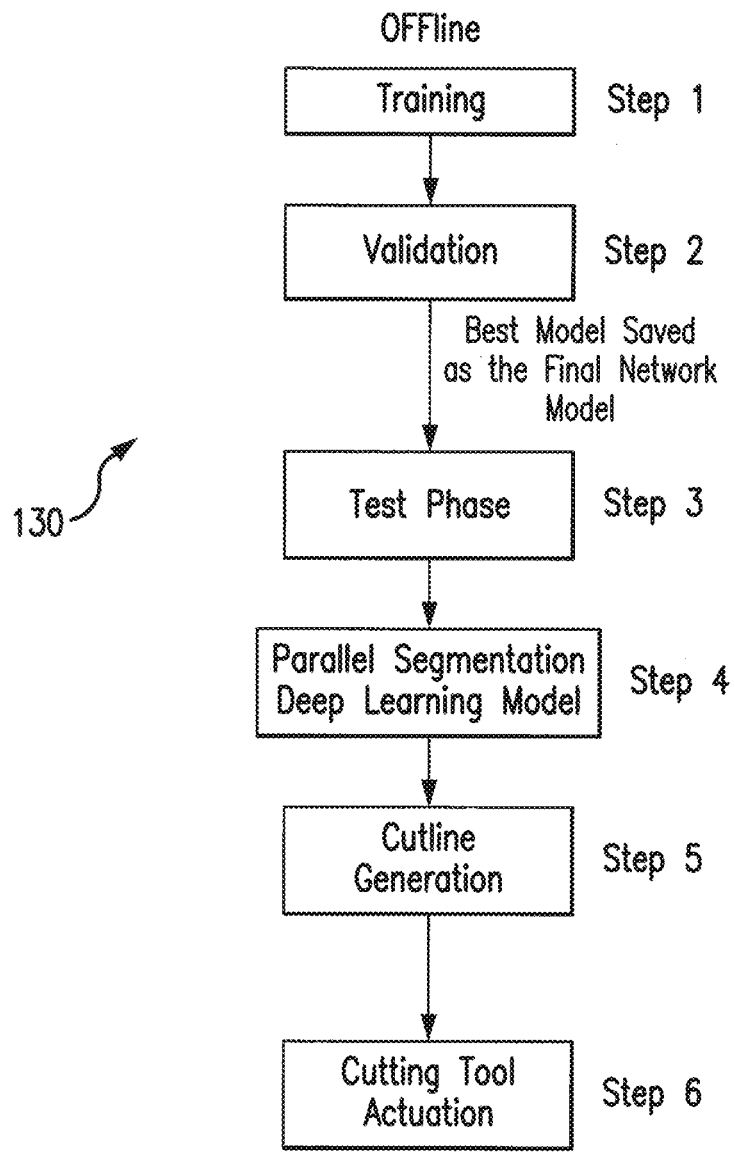
FIG. 25B is an operational flowchart diagram for generation crab cutline based on the Deep Learning processing routine.
Figure 26A:
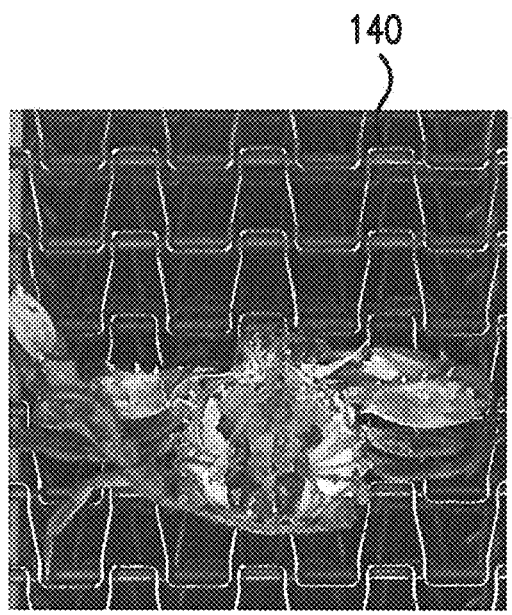
FIGS. 26A and 26C show typical crab images.
Figure 26B:
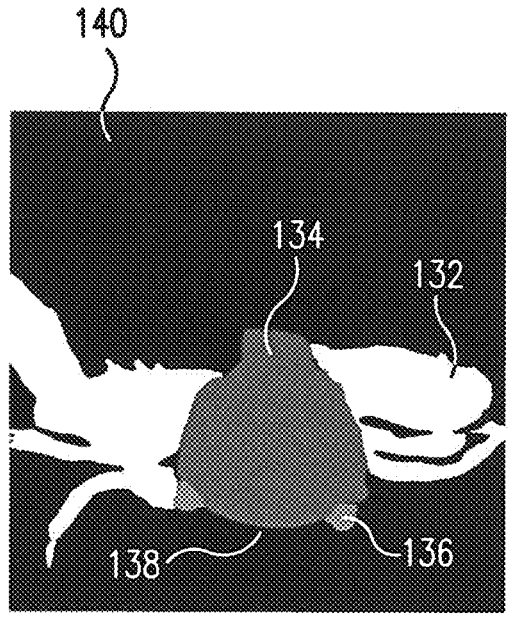
FIGS. 26B and 26D show corresponding segmentation results for the images of FIGS. 26A and 26C, respectively, using the well-trained U-net model.
Figure 26C:
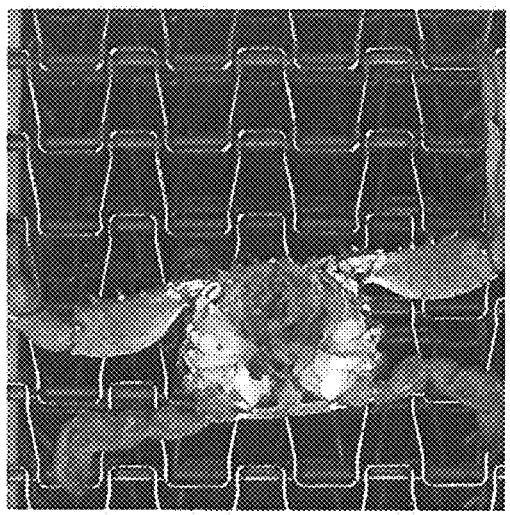
Figure 26D:
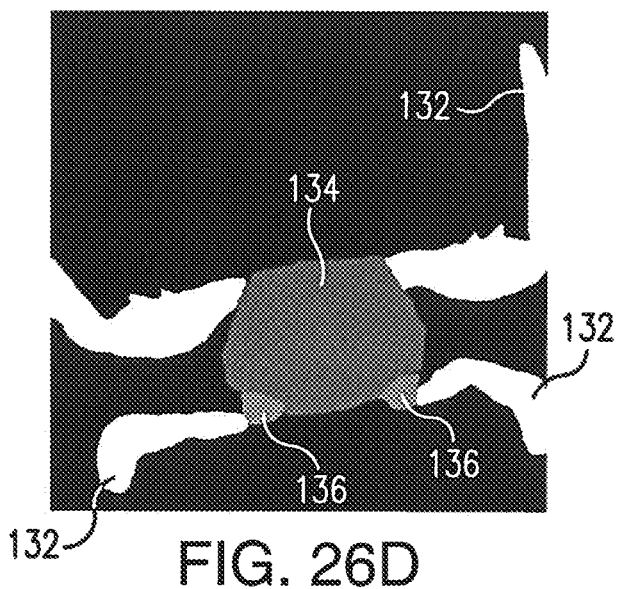

As shown in FIG. 25B, the Deep Learning routine 130 can be divided into two separate phases, including the training phase and test phase. The training process is performed offline in Step 1. In the experiment, the training batch size was set at 4. In each training epoch, the weights of network updated 2250 times. After each epoch, the model was validated in Step 2 based on the validation dataset. The best model for the validation dataset was saved as the final network model. The whole training process takes 160 min and the model classification loss and accuracy converge in about 20 epoch. The final loss and accuracy value of training dataset and validation dataset is shown in the Table.

TABLE 2

| Network Training Metrics | | |
|---|---|---|
| | Classification Loss | Classification Accuracy |
| Training dataset | 0.0289 | 0.9892 |
| Validation dataset | 0.0196 | 0.9943 |

The test phase was performed online in Step 3. In order to seamlessly integrate the trained Python network model into a C++ project, the python class was wrapped into C++ code with the C++ boost library. The segmentation results computed in Step 4 were transformed to C++ array for generating crab cutline in Step 5, and were coordinated with other image acquisition codes and motion control codes.

FIGS. 26A-26D depict two typical crab images (FIGS. 26A, 26C) and their corresponding segmentation results (FIGS. 26B, 26D) using the well-trained U-net model. The region 140 in FIGS. 26A-26D is the conveyor background. The regions 132 are crab legs. The regions 134 are the crab cores, the regions 136 are crab backfin knuckles, and the regions 138 represent the crab back bones.

To quantify the segmentation performance of the model, 50 images in the test dataset were segmented and their results are compared with the ground truth. The segmentation routine can be considered as a pixel-level classification problem. The multi-class confusion matrix was established based on the pixels, as shown in 3. The total number of test pixels are 32,000,000 and the average pixel level accuracy was 0.9843.

TABLE 3

Mutli-class confusion matrix for test dataset
(GT: ground truth, P: predicted results)

|  | Background (GT) | Legs (GT) | Crab Core (GT) | Backfin Knuckles (GT) | Back Bones (GT) |
| --- | --- | --- | --- | --- | --- |
| Background (P) | 23675208 (99.16%) | 143084 (3.62%) | 43328 (1.15%) | 7735 (3.46%) | 13961 (8.05%) |
| Legs (P) | 148957 (0.62%) | 3784552 (95.78%) | 25944 (0.69%) | 3176 (1.42%) | 0 (0%) |
| Crab Core (P) | 36417 (0.15%) | 20840 (0.53%) | 3685632 (97.61%) | 7920 (3.54%) | 6641 (3.83%) |
| Backfin Knuckles (P) | 7830 (0.03%) | 2616 (0.07%) | 10313 (0.27%) | 199628 (89.29%) | 1247 (0.72%) |
| Back Bones (P) | 7577 (0.03%) | 0 (0%) | 10804 (0.29%) | 5112 (2.29%) | 151478 (87.39%) |
| Total Pixels | 23875989 | 3951092 | 3776021 | 223571 | 173327 |
| Pixel-level Accuracy | 0.9916 | 0.9578 | 0.9761 | 0.8929 | 0.8739 |

Crab backfin knuckles were the key components in determining crab cutline in XY plane. To further quantify the performance of knuckle segmentation, the largest two knuckle blobs were extracted to rule out possible noises. Based on the centroid position of the crab core, two knuckles can be determined as left knuckle and right knuckle for both ground truth segmentation and predicted segmentation. Comparison results of the predicted and ground truth knuckle positions, including X and Y positions of both left and right knuckles, proved a high correlation between the predicted position and the ground truth position. With 5-pixel resolution, 81% knuckles were found correctly. With 10-pixel resolution, 97% knuckles were found correctly.

The distance between two knuckles is representative of the size of the crab. With 0.2 mm pixel resolution of the subject system, the accuracy of the predicted knuckle distance achieved was about 1 mm.

The subject network architecture shows great potential in preciseness of the automatic crab meat picking, including:
(a) the Deep Learning processing approach segments different crab components in parallel, and the network model is capable of balancing the segmentation accuracy of different classes of the crab body segments. Specifically, for the centroid of the crab core, the average deviation between the predicted centroid and the labelled centroid attained was 12.37 vs. 11.94 pixels.
(b) the U-net model (Deep Learning) is an all-in-one segmentation model and does not need any additional configurations in the test phase, and thus attains an extremely short computation time (about 241 ms).

In the subject Patent Application, an automated crab picking system is disclosed which uses intelligent vision sensors to guide high-pressure waterjets and other end effectors to expose and to harvest crab meats. The subject processing architecture focuses on understanding of crab's morphology based on 2D crab images. To achieve the subject system objectives, the Deep Learning model is integrated into the system. It can automatically segment the crab images into, for example, five ROIs (Region-of-Interest), with high speed and high accuracy, including (1) conveyor background, (2) crab legs, (3) crab core, (4) back-fin knuckles and (5) crab back bones. Among them, crab back-fin knuckles can determine the crab cutline in XY plane via a template matching strategy. Crab core can be used for locating the chamber meat of crab in the subsequent processing steps. The subject system can operate based on the patch based knuckle detection algorithm, and/or based on the Deep Learning algorithm model which can segment different crab components in a single step.

For the Deep Learning model, the computation time cost for single test image can sufficiently decrease about 50 folds compared to the patch-based knuckle detection. The average pixel classification accuracy in test dataset can reach 0.9843. As the initial step of crab meat picking machine, the Deep Learning model guides the machine to understand 2D crab morphologies and is integrated into the system seamlessly, which can meet the accuracy and efficiency requirements of a real-time crab machine.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A system for automatic crab processing, comprising:
a conveyor belt having a first end and a second end thereof, a plurality of crabs being loaded on the conveyor belt at said first end thereof in a spaced apart relationship one respective to another with a predetermined distance therebetween,
said conveyor belt being controllably linearly displaced in a stepped fashion with a step pitch corresponding to said predetermined distance between crabs;
a dual-modality imaging sub-system disposed in alignment with said conveyor belt in proximity to said first end thereof, said dual-modality imaging sub-system is to obtain one or more images of each of said crabs traveling on said conveyor belt, and said dual-modality imaging sub-system is to generate a respective 3-D crab model for each of said crabs based, at least in part, on 2-D crab morphology information and 3-D laser information obtained for respective said crabs;

at least one cutting station positioned along said conveyor belt downstream from said dual-modality imaging sub-system, said at least one cutting station being equipped with a controllable cutting tool for automatic crab cutting;

a computer system operatively coupled to said dual-modality imaging sub-system for receiving said images of the crabs and processing said images;

an image processing sub-system integrated with said computer system and configured for processing said images, said image processing sub-system generating instructions relative to at least a cutline of each of said crabs based on the respective 2-D crab morphology acquired from each of said images; and a control sub-system operatively coupled to said computer system, said at least one cutting station, and said conveyor belt to control and synchronize motion of said conveyor belt and operation of said cutting tool at said at least one cutting station in accordance with said at least cutline output by said image processing sub-system for automatic crab cutting.

2. The system of claim 1, further comprising a meat removal station disposed downstream of said at least one cutting station and equipped with at least one controllable end effector tool for automatic crab meat removal, wherein said control sub-system is further operatively coupled to said meat removal station to control and synchronize said at least one end effector tool at said meat removal station for automatic meat removal.

3. The system of claim 1, wherein said image processing sub-system is a Convolution Neutral Network (CNN) processing sub-system configured to determine, based on color information extracted from said images, a back-fin knuckle position, and to generate said cutline in the XY plane based on the back-fin knuckle position, said cutline being transmitted from said image processing sub-system to said control sub-system and said at least one cutting station to actuate said cutting tool in accordance therewith.

4. The system of claim 1, wherein said image processing sub-system includes a Deep Learning model-based segmentation processing sub-system and a post-segmentation processing sub-system, wherein said Deep Learning model-based segmentation processing sub-system is adapted for in-one-step segmentation of a respective one of said images into a plurality of regions-of-interest (ROIs), including at least a conveyor background, crab legs, crab core, back-fin knuckles, and crab back bones, and wherein said post-segmentation processing sub-system is adapted for computing the cutline in at least the XY plane using position of said back-fin knuckles via a template matching routine, and for locating crab chamber meat based on position of a crab core.

5. The system of claim 1, wherein said dual-modality imaging sub-system includes a Red-Green-Blue (RGB) color imaging sub-system and a 3-dimensional (3-D) laser imaging sub-system, wherein said RGB color imaging sub-system generates the 2-D crab morphology information of respective said crabs, including a crab size and a crab orientation on the conveyor belt, and wherein said 3-D laser imaging sub-system generates the 3-D laser information of respective said crabs.

6. The system of claim 5, wherein said at least one cutting station includes: a vertical cutting station for cutting each of the crabs along lump meat walls of each respective crab to reveal jumbo meat components based on respective 2-D crab morphology information of each crab, and an angled cutting station for performing an angular cut based on a 3-D crab model of a respective crab to expose small compartments of the respective crab's body, wherein each of said vertical cutting station and said angled cutting station are equipped with said cutting tool configured with a waterjet nozzle for performing cuts in XYZ directions.

7. The system of claim 6, wherein said control sub-system includes a set of digitally controlled, at a predetermined motion speed and precision, linear motors operatively coupled to said vertical cutting station, an angular servo-motor operatively coupled to said angled cutting station, and a step motion servo-motor operatively coupled to said conveyor belt, wherein said control sub-system tracks a position of each of said crabs at said vertical cutting station, said angled cutting station, and a meat removal station.

8. The system of claim 7, wherein said control sub-system includes an encoder sub-system coupled to said computer system and generating a clock signal processed by said computer system to synchronize and track the operation of said conveyor belt, said dual-modality imaging sub-system, said at least one cutting station, and said meat removal station, and wherein said image processing sub-system, said vertical cutting station, said angled cutting station, and said control sub-system share said instructions generated by said image processing sub-system.

* * * * *